United States Patent [19]

Spencer et al.

[11] Patent Number: 5,231,151
[45] Date of Patent: Jul. 27, 1993

[54] SILICA SUPPORTED TRANSITION METAL CATALYST

[75] Inventors: Lee Spencer, Pearland; Brian W. S. Kolthammer, Lake Jackson; Miriam P. Ripplinger, Lake Jackson; Jeffrey J. Wooster, Lake Jackson; Pak-Wing S. Chum, Lake Jackson; Jacquelyn A. deGroot, Freeport, all of Tex.

[73] Assignee: The Dow Chemical Company, Midland, Mich.

[21] Appl. No.: 854,175

[22] Filed: Mar. 20, 1992

Related U.S. Application Data

[63] Continuation-in-part of Ser. No. 644,053, Jan. 18, 1991, abandoned.

[51] Int. Cl.$^5$ .................. C08F 4/685; C08F 4/646
[52] U.S. Cl. ................... 526/116; 526/124; 526/129; 526/151; 502/113; 502/115
[58] Field of Search ............... 526/116, 129, 151, 124

[56] References Cited

U.S. PATENT DOCUMENTS

| | | |
|---|---|---|
| 3,113,115 | 12/1963 | Ziegler et al. . |
| 3,257,332 | 6/1966 | Ziegler et al. . |
| 3,645,992 | 2/1972 | Elston . |
| 3,787,384 | 1/1974 | Stevens et al. ............ 260/94.9 DA |
| 3,876,565 | 4/1975 | Takashima et al. . |
| 4,100,238 | 7/1978 | Shinomura . |
| 4,148,754 | 4/1979 | Strobel et al. .................... 502/108 |
| 4,173,547 | 11/1979 | Graff ................................. 502/110 |
| 4,198,038 | 4/1980 | Quinter . |
| 4,205,021 | 5/1980 | Morita et al. . |
| 4,374,753 | 2/1983 | Pullukat et al. .................. 502/169 |
| 4,426,316 | 1/1984 | Gessell ............................. 502/169 |
| 4,446,288 | 5/1984 | Hoff .................................. 526/129 |
| 4,451,574 | 5/1984 | Johnson ............................ 502/115 |
| 4,472,328 | 9/1984 | Sugimoto et al. . |
| 4,478,988 | 10/1984 | Pullukat et al. ................... 526/129 |
| 4,481,301 | 11/1984 | Nowlin et al. ..................... 502/104 |
| 4,481,342 | 11/1984 | Invernizzi et al. . |

(List continued on next page.)

FOREIGN PATENT DOCUMENTS 2053939 2/1981 United Kingdom .

OTHER PUBLICATIONS

Polym. Engng. Sci 25, No. 5, pp. 279∝283, Mid-Apr., 1985.
Derwent 83-786729/41 (1983).
Derwent 88-297390/42 (1988).
Derwent 89-071723/10 (1989).
Derwent 89-071724/10 (1989).
(List continued on next page.)

*Primary Examiner*—Patrick P. Garvin

[57] ABSTRACT

A transition metal containing catalyst useful for the polymerization of α-olefins is prepared by (A) forming in an inert atmosphere which excludes oxygen and moisture a slurry of (1) a porous inorganic oxide support material selected from the group consisting of silica, alumina, or a combination of silica and alumina, said support material containing not greater than about 5 millimoles of hydroxyl groups per gram of support material and a particle size not greater than about 10 microns and a surface area of from about 50 to about 800 m$^2$/g in an inert organic liquid medium; (B) mixing said slurry with (2) an alkoxide and stirring the resultant mixture at a temperature of from about −20° C. to about 120° C. for a time sufficient to saturate the surface of the support material; (C) mixing the product form (B) with (3) a titanium compound or a combination of a titanium compound and (4) a vanadium compound and stirring the resultant mixture at a temperature of from about −20° C. to about 120° C. for a time sufficient to allow complete reaction of the titanium compound and the vanadium compound with the organomagnesium moieties remaining on the solid support; (D) mixing the product from (C) with an inert organic solution of (5) a Group IIIA metal alkyl halide at a temperature of from about −20° C. to about 120° C. for a time sufficient to complete the reduction of the titanium and vanadium, if present, compounds to their final oxidation state.

10 Claims, No Drawings

U.S. PATENT DOCUMENTS

| | | |
|---|---|---|
| 4,522,987 | 6/1985 | Hogan et al. . |
| 4,526,943 | 7/1985 | Fuentes, Jr. et al. ............ 526/124 X |
| 4,544,647 | 10/1985 | Fuentes, Jr. et al. ............... 502/115 |
| 4,558,024 | 12/1985 | Best ...................................... 502/115 |
| 4,593,009 | 6/1986 | Nowlin ................................. 502/107 |
| 4,612,300 | 9/1986 | Coleman, III . |
| 4,661,465 | 4/1987 | Fuentes, Jr. et al. ................ 502/111 |
| 4,672,096 | 6/1987 | Nowlin ................................. 526/116 |
| 4,677,087 | 6/1987 | Lo et al. ............................... 502/104 |
| 4,783,512 | 11/1988 | Gessell ................................. 526/142 |
| 4,829,096 | 5/1989 | Kitamura et al. . |
| 4,833,111 | 5/1989 | Nowlin ................................. 502/107 |
| 4,849,267 | 7/1989 | Ward et al. . |
| 4,849,389 | 7/1989 | Nowlin ................................. 502/107 |
| 4,849,390 | 7/1989 | Sano et al. ...................... 526/129 X |
| 4,878,974 | 11/1989 | Kagawa . |
| 4,891,173 | 1/1990 | Saitoh et al. . |
| 4,894,265 | 1/1990 | Chang et al. . |
| 4,910,272 | 3/1990 | Marchand et al. .................. 526/129 |
| 4,918,038 | 4/1990 | Samuels et al. . |
| 4,963,426 | 10/1990 | Nishimoto et al. . |

OTHER PUBLICATIONS

CA 72(14):67859s (1969).
CA 75(2):6984u (1971).
CA 90(24):188237t (1979).
CA 96(26):219004v (1982).
CA 98(12):90771c (1982).
CA 98(16):127414s (1983).
CA 98(20):161832m (1983).
CA 99(18):141197a (1983).
CA 100(8):52814w (1983).
CA 102(2):7859v (1984).
CA 103(26):216517s (1985).
CA 104(12):90059u (1985).
CA 105(4):25218b (1986).
CA 105(4):25545f (1986).
CA 108(14):113732g (1987).
CA 110(6):40368x (1988).
CA 110(24):214474w (1989).
CA 111(10):79577k (1989).
CA 111(10):79690s (1989).
CA 111(20):175415b (1989).
CA 111(20):175416c (1989).
Kühre, C. J., M. Wales and M. E. Doyle in "Crystallization-Modified Polypropylene," *SPE Journal*, pp. 1113–1119, Oct. 1964.
Narh, K., J. Odell, A. Keller and G. Fraser in "The effect of nucleation density on the kinetics of crystallization and on the resulting structure and thermal properties of polymers crystallized during cooling," *J. Mat. Sci.* pp. 2001–2009(1990).
Dohrer, K., L. Hazlitt and N. Whiteman in "Short Chain Branching Distribution of ULDPE," *J. Plastic Film and Sheeting*, vol. 4, pp. 214–226, Jul. 1988.
*Eur. Plast. News 14*, No. 5, "Cast Film Palletwrap Selection" p. 47, May 1987.
*Poliplasti Plast. Rinf. 31*, Nos. 308/9, "Linear Low Density Polyethylene in Extrusion and Moulding," pp. 24–39, Jul./Aug. 1983.
*Poliplasti Plast. Rinf.* 31, No. 306, "Advantages and Disadvantages of Blends of Conventional and Linear Low Density Polyethylenes" pp. 45–55, May 1983.
*Journal of Applied Polymer Science: Applied Polymer Symposium 45*, pp. 25–37 (1990).

SILICA SUPPORTED TRANSITION METAL CATALYST

RELATED APPLICATION INFORMATION

This application is a continuation-in-part of pending application Ser. No. 07/644,053, filed Jan. 18, 1991 and now abandoned, the disclosure of which is incorporated herein by reference.

FIELD OF THE INVENTION

The present invention pertains to solid inorganic oxide (e.g., silica) supported transition metal catalysts, a process for polymerizing olefins in their presence, polymers made by this polymerization process and films made from some specific polymers.

BACKGROUND OF THE INVENTION

The polymerization of ethylene and the copolymerization of ethylene with other olefins is known to be carried out by gas phase, solution and/or suspension (slurry) polymerization processes. Advantages of the solution process include short reaction times, improved heat removal and monomer conversion for mass and energy control of polymerizations and single-phase reaction environments for controlling reaction dynamics. A most advantageous solution polymerization would be conducted at even higher reaction temperatures yet with a polymerization catalyst that yields sufficiently high molecular weight polymers with a high catalyst efficiency at these higher temperatures which lowers catalyst residues in the product and/or permits complete omission of the catalyst removal step.

In the suspension (slurry) polymerization of olefins, the advantages are low pressures, low temperatures and the ability to make very high molecular weight polymers. It is advantageous to carry out these reactions with sufficiently high polymerization efficiencies such that residues from the polymerization catalyst do not have to be removed from the resulting polymer.

There are many polymerization catalysts for suspension polymerization known in the art. Hagerty et al. in U.S. Pat. No. 4,562,169 disclose the preparation of a supported catalyst by treating a solid porous carrier having reactive OH groups such as silica in a liquid medium with an organomagnesium compound to react with the OH groups on the carrier; evaporating said liquid to precipitate magnesium onto the carrier and recovering a supported magnesium composition in the form of a dry, free-flowing powder; reacting the powder with a tetravalent titanium compound in a liquid medium. The catalyst is useful in the polymerization of olefins.

Nowlin in U.S. Pat. No. 4,593,009 and U.S. Pat. 4,672,096 discloses a catalyst for polymerizing olefins which catalyst is prepared by treating a carrier containing OH groups with an organomagnesium composition and contacting the thus-formed magnesium-containing carrier with a solution of at least one tetravalent vanadium compound or a solution containing both a vanadium compound and a titanium compound.

Gessel in U.S. Pat. No. 4,244,838 describes catalysts prepared from an organomagnesium compound, an organic hydroxyl-containing material and a transition metal halide. These solids produced by this reaction are isolated and washed prior to use in a polymerization.

Fuentes et al. in U.S. Pat. No. 4,544,647 disclose catalyst compositions prepared from an organomagnesium material, an organic hydroxyl-containing material, a reducing halide source and a transition metal compound.

Marchand et al. in U.S. Pat. No. 4,910,272 describe a process for polymerizing olefins in the presence of a catalyst prepared from an inorganic oxide, an organomagnesium material, an organic hydroxyl-containing material, a reducing halide source and a transition metal compound.

The catalyst efficiency of these catalysts is, in general, decreased with increased polymerization temperatures, specifically temperatures above 140° C.

The catalysts known for solution polymerization comprise an organomagnesium component, an aluminum halide and/or an additional halide source and a transition metal compound. Lowery et al in U.S. Pat. No. 4,250,288 describes such compositions that are useful in the polymerization of α-olefins above 140° C.

Sakurai et al. in U.S. Pat. No. 4,330,646 describes similar catalysts containing a titanium or a titanium and/or a vanadium compound as the transition metal component. These catalysts are useful at polymerization temperatures of at least 180° C. The disadvantage of these catalysts is that the reactions that produce the catalyst solids are highly exothermic and difficult to control and reproduce. These catalyst compositions also contain a large excess of halide with respect to the transition metal component and yield polymers with a relatively high halide content. The composition as a whole is used directly in the polymerization of olefins.

It is well known in the art to optimize the properties of linear low density polyethylene (LLDPE) by variation in product molecular weight, molecular weight distribution (MWD) and density to match the required product application. Increasing the molecular weight, narrowing the MWD or lowering the density of LLDPE usually results in improved impact strength and puncture resistance properties. Molecular weight of the polymer prepared in Ziegler Natta catalyzed processes (as described by Professor Karl Ziegler in U.S. Pat. Nos. 3,113,115 and 3,257,332) is typically controlled in the process by the addition of varying amounts of telogens most commonly hydrogen. Similarly the density of the product is typically controlled by varying the comonomer concentration in the reaction medium.

In addition to optimizing product molecular weight and density for a given product application further improvement in resin performance can be obtained by narrowing the molecular weight distribution of a given melt index and density product. U.S. Pat. No. 4,612,300 describes a process for preparing LLDPE copolymers with narrow molecular weight distribution using a specific catalyst formulation, resulting in polymers for film applications with improved clarity and toughness.

Yet another property known to improve the clarity and toughness of alpha-olefin polymers is a small spherulite size as described for polypropylene (Kuhre et al, SPE Journal, Oct, 1964. pps 1113–1119) and polyethylene (Narh et al, J. Mat. Sci, 15 (1980), pps 2001–2009). Similarly, U.S. Pat. No. 4,205,021 discloses copolymers with densities from 0.90 to 0.94 g/cm$^3$ with exceedingly high weight average molecular weight but with the intrinsic viscosities of conventional ethylene copolymers and spherulite sizes of not more than six microns.

Linear low density polyethylene (LLDPE) produced with Ziegler catalysts have side groups introduced into the molecule from copolymerization with comonomers. In the case of 1-octene this side group would have six carbons atoms i.e. a hexyl chain. The distribution of these side groups or branches along and among all the polymer molecules is known as the polymer Short Chain Branching Distribution (SCBD) and the nature of this distribution has a strong impact on product properties an performance.

*J. Plastic Film and Sheeting*, Vol 4, July 1988, pps 214-226, "Short Chain Branching Distribution of ULDPE", K. Dohrer L. G. Hazlitt, N. F. Whiteman), teaches that LLDPE copolymers prepared using a catalyst known to produce narrow molecular weight distribution LLDPE copolymers with a density greater than about 0.87 but less than 0.918 g/cm$^3$ have unexpectedly improved (lower) amounts of n-hexane extractables than those from similar density products of other catalysts when having a narrow SCBD. Also in this study, a quantitative measurement of SCBD was introduced, the $z_1/z_0$ or simply the z ratio. By this definition, polymers of similar densities should have similar values of $z_1$ but polymers with a broader SCBD will have a lower value of $z_0$. Therefore if $z_1/z_0$ is low the SCBD is narrow and vice versa.

U.S. Pat. No. 4,438,238 discloses ethylene/alpha olefin copolymers with improved properties formed by mixing copolymers of high molecular weight and specified SCB (short chain branches/1000 carbons) with copolymers of lower molecular weight and specified SCB results in resins of 0.91 to 0.94 g/cm$^3$ density and melt index of 0.02 to 50 g/10 min and melt flow ratio of 35 to 250 with excellent strength properties.

U.S. Pat. No. 4,918,038 discloses a process for the production of ethylene homopolymers or copolymers with a broad and/or bimodal molecular weight distribution using a mixed catalyst system. One advantage of this system is that the product can be made in a single reactor rather than using multistage reactors which raise questions of efficiency and cost.

U.S. Pat. No. 4,481,342 teaches a method of preparing an ethylene/alpha olefin copolymer of varying alpha olefin content, the incorporation of which is controlled by the porosity and pore radius of the magnesium chloride support.

U.S. Pat. No. 4,522,987 discloses a process using a chromium based catalyst system in which the incorporation of comonomer into the polymer chain occurs in a "super-random" fashion as described by the relative comonomer dispersity (RMD) as determined by N.M.R. The dispersity is controlled by the nature of the comonomer and varying its concentration in mole percent in the gas phase.

U.S. Pat. No. 3,645,992 discloses a continuous process for the preparation of homogeneous random partly crystalline copolymers of narrow MWD. The degree of homogeneity is controlled by varying the reactor temperature. Similarly homogeneity was decreased when $R_2AlCl$ was used as cocatalyst rather than $R_{1.5}AlCl_{1.5}$ or $RAlCl_2$. Similarly increasing the ratio of cocatalyst to catalyst to greater than 9:1 for octene copolymers was required to yield homogeneous copolymers.

It would be desirable to have available catalyst compositions which exhibit significantly higher polymerization efficiencies based on the transition metal and the halide. It would also be desirable to have available catalyst compositions which exhibit these high efficiencies while being prepared in a manner which did not require the isolation and/or washing of the solid catalytic product. It would be further desirable to ease the process of preparation of the catalyst in order to increase reproducibility and quality of the catalyst.

It would also be desirable to have available such catalysts which would provide polymers having a high molecular weight and a relatively narrow molecular weight distribution and which exhibit more tolerance to hydrogen at polymerization temperatures of at least 180° C. and even greater than 200° C.

Also, it would be advantageous to have a solution process which, at a given melt index and density, results in a narrow molecular weight distribution product with small spherulite size, the SCBD of which, can be easily controlled to yield the desired combination of polymer properties for the specific product application.

SUMMARY OF THE INVENTION

One aspect of the present invention pertains to a supported transition metal catalyst component which comprises an inert liquid medium having slurried therein a composition comprising the product resulting from contacting (1) a porous solid inorganic oxide support material selected from the group consisting of silica, alumina, or a combination of silica and alumina, said support material containing not greater than about 5 millimoles of hydroxyl groups per gram of support material and a particle size not greater than about 10 microns and a surface area of from about 50 to about 800 m$^2$/g; (2) a hydrocarbon soluble organomagnesium alkoxide or hydrocarbon soluble magnesium dialkoxide; (3) a titanium compound; optionally (4) a vanadium compound; and (5) a Group IIIA metal alkyl halide; and wherein the components are employed in amounts which provide the following atomic ratios:

Si+Al (from the inorganic oxide support):Mg of from about 1:1 to about 30:1;
Mg:Ti of from about 0.2:1 to about 10:1;
Mg:V of from about 0:1 to about 10:1;
Mg:IIIA metal of from about 0.05:1 to about 5:1; and
V:Ti of from about 0:1 to about 5:1.

Another aspect of the present invention pertains to a process for preparing a supported transition metal catalyst component slurried in an inert liquid medium, which process comprises (A) forming in an inert atmosphere which excludes oxygen and moisture a slurry of (1) a porous inorganic oxide support material selected from the group consisting of silica, alumina, or a combination of silica and alumina, said support material containing not greater than about 5 millimoles of hydroxyl groups per gram of support material and a particle size not greater than about 10 microns and a surface area of from about 50 to about 800 m$^2$/g in an inert organic liquid medium; (B) mixing said slurry with (2) a hydrocarbon soluble organomagnesium alkoxide or hydrocarbon soluble magnesium dialkoxide and stirring the resulting mixture at a temperature of from about −20° C. to about 120° C. for a time sufficient to saturate the surface of the support material; (C) mixing the product from (B) with (3) a titanium compound or a combination of a titanium compound and (4) a vanadium compound or adding the titanium compound and vanadium compound separately and stirring the resultant mixture at a temperature of from about −20° C. to about 120° C. for a time sufficient to allow complete reaction of the titanium compound and the vanadium compound with the organomagnesium moieties remaining on the solid support; (D) mixing the product from (C) with an inert organic solution of (5) a Group IIIA metal alkyl halide at a temperature of from about −20° C. to about 120° C. for a time sufficient to complete the reduction of the titanium and vanadium, if present, compounds to their final oxidation state.

A further aspect of the present invention pertains to a process for polymerizing one or more α-olefins and optionally one or more polymerizable ethylenically unsaturated compounds other than an α-olefin which process comprises contacting the materials to be polymerized with (A) a supported transition metal containing catalyst component comprising the product resulting from contacting (1) a porous inorganic oxide support material selected from the group consisting of silica, alumina, or a combination of silica and alumina, said support material containing not greater than about 5 millimoles of hydroxyl groups per gram of support material and a particle size less than 10 microns and a surface area of from about 50 to about 800 m$^2$/g; (2) a hydrocarbon soluble organomagnesium alkoxide or hydrocarbon soluble magnesium dialkoxide; (3) a titanium compound; optionally (4) a vanadium compound; and (5) a Group IIIA metal alkyl halide; and wherein the components are employed in amounts which provide the following atomic ratios:

Si+Al:Mg of from about 1:1 to about 30:1;
Mg:Ti of from about 0.2:1 to about 10:1;
Mg:V of from about 0.2:1 to about 10:1;
Mg:IIIA metal of from about 0.05:1 to about 5:1;
V:Ti of from about 0:1 to about 5:1; and (B) a cocatalyst or activator for component (A).

Still another object of the present invention pertains to process for varying the short chain branching distribution (SCBD) of ethylene/α-olefin copolymers which comprises (I) subjecting ethylene and one or more α-olefin comonomers to solution polymerization conditions in the presence of a catalyst composition comprising (A) a supported transition metal containing catalyst component comprising the product resulting from contacting (1) a porous inorganic oxide support material selected from the group consisting of silica, alumina, or a combination of silica and alumina, said support material containing not greater than about 5 millimoles of hydroxyl groups per gram of support material and a particle size less than 10 microns and a surface area of from about 50 to about 800 m$^2$/g; (2) a hydrocarbon soluble organomagnesium alkoxide or hydrocarbon soluble magnesium dialkoxide; (3) a titanium compound; optionally (4) a vanadium compound; and (5) a Group IIIA metal alkyl halide; and wherein the components are employed in amounts which provide the following atomic ratios:

Si+Al:Mg of from about 1:1 to about 30:1;
Mg:Ti of from about 0.2:1 to about 10:1;
Mg:V of from about 0.2:1 to about 10:1;
Mg:IIIA metal of from about 0.05:1 to about 5:1;
V:Ti of from about 0.8:1 to about 1.2:1; and (B) a cocatalyst or activator for component (A); and (II) controlling the SCBD by varying the ratio of Mg:Ti in component (A).

The present invention provides catalyst compositions which exhibit high polymerization efficiencies based on the transition metal and the halide and are prepared in a manner which do not require the isolation and/or washing of the solid catalytic product. The catalysts which contain vanadium produce a polymer having a high molecular weight and a relatively narrow molecular weight distribution when the polymers are prepared by the solution process.

The present invention provides catalyst compositions which exhibit high polymerization efficiencies based on the transition metal and the halide and are prepared in a manner which do not require the isolation and/or washing of the solid catalytic product. The catalysts which contain vanadium produce a polymer having a relatively broad molecular weight distribution when the polymers are prepared by the slurry process.

The present invention also provides a process for preparing ethylene/α-olefin copolymers which at a given melt index and density results in a narrow molecular weight distribution product with small spherulite size and controlling the short chain branching distribution by varying the Mg:Ti atomic ratio so as to produce copolymers with a desired combination of polymer properties for specific product applications.

Yet another aspect of the present invention is to provide ethylene/α-olefin copolymers which are particularly effective in making films, especially cast films used in pallet wrapping applications. The copolymers are advantageously made using the cataylst compositions and process described herein. The copolymers can be used, e.g., as a core layer in a multilayer coextruded cast film structure, or they can be used by themselves in the film. The specific copolymers have a high density fraction greater than about 17 percent and a molecular weight distribution (indicated by Mw/Mn) of less than about 3.6 and, when converted into film form, provide greater overall film stretchability and puncture resistance.

DETAILED DESCRIPTION OF THE INVENTION

All references herein to elements or metals belonging to a certain Group refers to the Periodic Table Of The Elements published by the Sargent-Welch Scientific Company, Skokie Ill., catalog number S-18806 (1968).

The term "hydrocarbyl" as employed herein means any aliphatic, cycloaliphatic, aromatic, aryl substituted aliphatic, aryl substituted cycloaliphatic, aliphatic substituted aromatic or aliphatic substituted cycloaliphatic groups.

The term "hydrocarbyloxy" means a hydrocarbyl group having an oxygen linkage between it and the carbon atom to which it is attached.

The term "copolymer" as employed herein means a polymer produced by polymerizing a mixture of two or more polymerizable ethylenically unsaturated monomers.

PREPARATION OF TRANSITION METAL CATALYST

The transition metal catalyst of the present invention can be prepared in the following manner.

The porous inorganic oxide support material is slurried in an inert organic diluent under conditions which exclude oxygen (air) and moisture at a temperature of from about −20° C. to about 120° C., preferably from about 0° C. to about 100° C., more preferably from about 20° C. to 70° C. No particular time is required other than that to form a uniform slurry of the support in the diluent. This depends upon the amounts involved, but usually a good uniform slurry can be formed in about 1 hour in a concentration range from about 0.1 to about 15, preferably from about 0.5 to about 10, more preferably from about 1 to about 7, weight percent.

To this slurry is then added the hydrocarbon soluble organo magnesium alkoxide or hydrocarbon soluble magnesium dialkoxide, again under conditions which exclude oxygen (air) and moisture, and the mixture stirred at a temperature of from −20° C. to about 120° C., preferably from about 0° C. to about 100° C., more preferably from about 20° C. to about 70° C. for a time sufficient to react the magnesium compound with surface of the solid support, usually from about 0.1 to about 10, preferably from about 0.2 to about 8, more preferably from about 0.5 to about 4, hours.

After the above addition of the magnesium compound, a titanium compound or a combination of a titanium compound and a vanadium compound is added, again under conditions which excludes oxygen (air) and moisture, and the mixture stirred at a temperature of from −20° C. to about 120° C., preferably from about 0° C. to about 100° C., more preferably from about 20° C. to 70° C. for a time sufficient to completely react the titanium compound and the vanadium compound with the reactive silica and magnesium functionalities, usually from about 0.1 to about 100, preferably from about 0.5 to about 20, more preferably from about 1 to about 10, hours. The titanium and vanadium compounds can be premixed prior to their addition or they can be added separately in any order to the product resulting from blending the magnesium compound with the slurry of the inorganic oxide support material.

Following the addition and mixing of the titanium and/or vanadium compounds, a Group IIIA metal alkyl halide is added and the mixture is stirred at a temperature of from about −20° C. to about 120° C., preferably from about 0° C. to about 100° C., more preferably from about 20° C. to 70° C. for a time sufficient to reduce the titanium compound and vanadium compound, if present, to their final oxidation states, usually from about 1 to about 100, preferably from about 2 to about 50, more preferably from about 5 to about 20, hours.

Upon completion of the addition and mixing of the Group IIIA metal alkyl halide, the thus formed transition metal catalyst component can be employed in the polymerization of α-olefins as is without isolation of the solid components from the liquid components. The transition metal catalyst component can be employed immediately upon its preparation or the component can be stored under inert conditions for some length of time, usually for periods of time as long as 90 days.

The components can also, if desired, be added in the order as follows: $SiO_2$ + Mg compound + Ti compound + Al compound + V compound.

The components can also, if desired, be added in the order as follows: $SiO_2$ + Mg compound + Al compound + Ti compound + V compound.

Oxygen (air) and moisture can be excluded during catalyst preparation by conducting the preparation in an inert atmosphere such as, for example, nitrogen, argon, xenon, methane and the like.

COMPONENTS OF THE TRANSITION METAL CATALYST

Porous Support Material

Suitable porous silica or alumina support materials which can be employed herein include, those containing not greater than about 5, preferably not greater than about 4, more preferably not greater than about 3, millimoles of hydroxyl groups (OH) per gram of support material. These hydroxyl (OH) groups are isolated silanol groups on the silica surface.

The hydroxyl groups can be reduced or eliminated by treating the support material either thermally or chemically. Thermally, the support material can be heated at temperatures of from about about 250° C. to about 870° C., more preferably from about 600° C. to 800° C. for a time sufficient to reach the equilibrium hydroxyl group concentration, usually from about 1 to about 24, preferably from about 2 to about 20, more preferably from about 3 to about 12, hours.

The hydroxyl (OH) groups can be removed or reduced chemically by treating the support material with $SiCl_4$, chlorosilanes, silylamines, or any combination thereof and the like at a temperature of from about −20° C. to about 120° C., more preferably from about 0° C. to 40° C. for a time sufficient to reduce the hydroxyl content to the desired value, usually less than about 30 minutes.

The porous support material has a particle size of not greater than about 10, preferably from about 0.1 to about 10, more preferably from about 1 to about 9, most preferably from about 2 to about 8, microns and a surface area in the range of from about 50 to about 800, preferably from about 150 to about 600, more preferably from about 300 to about 500, $m^2/g$.

The particle size of the support is important as it has been discovered that lowering the particle size of the support below 10 microns while maintaining the support surface area and porosity results in an unexpected increase in the catalyst productivity and hence a reduction in product chloride and titanium residues relative to products of the same catalyst made on a support of equivalent surface area and porosity but larger particle size.

Inert Liquid Diluent

Suitable inert liquid diluents which can be employed to slurry the inorganic oxide support material and as a diluent for any of the other components employed in the preparation of the catalyst include, for example, aliphatic hydrocarbons, aromatic hydrocarbons, naphthinic hydrocarbons, or any combination thereof and the like. Particularly suitable solvents include, for example, pentane, isopentane, hexane, heptane, octane, isooctane, nonane, isononane, decane, cyclohexane, methylcyclohexane, toluene, any combination of any two or more of such diluents, or any combination of any two or more of such diluents and the like.

Magnesium Compound

Suitable magnesium compounds which can be employed in the preparation of the transition metal catalyst component include, for example, those hydrocarbon soluble organomagnesium compounds represented by the formulas $R_xMg(OR)_y$; wherein each R is independently a hydrocarbyl group having from 1 to about 20, preferably from about 1 to about 10, more preferably from about 2 to about 8, carbon atoms; $x+y=2$; and $0.5 \leq y \leq 2$. Preferably, x has a value of zero or 1 and y has a value of 1 or 2 and most preferably, x has a value of 1 and y has a value of 1.

Particularly suitable magnesium compounds include, for example, n-butylmagnesium butoxide, ethylmagnesium butoxide, butylmagnesium ethoxide, octylmagnesium ethoxide, butylmagensium i-propoxide, ethylmagnesium i-propoxide, butylmagnesium n-propoxide, ethylmagnesium n-propoxide, s-butylmagnesium butoxide, butylmagnesium 2,4-dimethylpent-3-oxide, n-butylmagnesium octoxide, s-butylmagnesium octoxide, or any combination thereof and the like.

Also suitable are the hydrocarbon soluble reaction product (dialkoxide) of a magnesium dihydrocarbyl (MgR$_2$) compound and an oxygen-containing compound (ROH) such as, for example, an aliphatic or cycloaliphatic or acyclic C$_5$–C$_{18}$ beta or gamma alkyl-substituted secondary or tertiary monohydric alcohol, as disclosed by Kamienski in U.S. Pat. No. 4,748,283 which is incorporated by reference. The reaction is preferably conducted in the presence of a liquid hydrocarbon media. The alcohol is usually employed in slightly more than twice the molar equivalent, based on magnesium. The reaction is usually conducted at temperatures not in excess of about 50° C., preferably below 40° C. Particularly suitable oxygen containing compounds include, for example, 2,4-dimethyl-3-pentanol, 2,3-dimethyl-2-butanol, 2,4-dimethyl-3-hexanol, 2,6-dimethyl-4-heptanol, 2,6-dimethyl-cyclohexanol, or any combination thereof and the like. Particularly suitable magnesium dialkyl compounds include, for example, butylethylmagnesium, dibutylmagnesium, dihexylmagnesium, butyloctylmagnesium, any combination thereof and the like.

Titanium Compound

Suitable titanium compounds which can be employed in the preparation of the transition metal catalyst component include, for example, those represented by the formula TiX$_{4-a}$(OR')$_a$; wherein each R' is independently an alkyl group having from 1 to about 20, preferably from about 1 to about 10, more preferably from about 2 to about 8, carbon atoms; X is a halogen atom, preferably chlorine; and a has a value from zero to 4. Particularly suitable titanium compounds include, for example, titanium tetrachloride (TiCl$_4$), titanium tetraisopropoxide (Ti(O—i—C$_3$H$_7$)$_4$), titanium tetraethoxide (Ti(OC$_2$H$_5$)$_4$), titanium tetrabutoxide (Ti(OC$_4$H$_9$)$_4$), titanium triisopropoxidechloride (Ti(O—i—C$_3$H$_7$)$_3$Cl), or any combination thereof and the like.

Vanadium Compound

In the solution process, when it is desirable to produce α-olefin polymers which have a high molecular weight and a relatively narrower molecular weight distribution than that produced with the catalyst containing only titanium as the transition metal, a vanadium compound can be added as a portion of the transition metal component during preparation of the catalyst. A narrowing of the molecular weight distribution is indicated by a lowering of the I$_{10}$/I$_2$ value of the polymer.

By the term "relatively narrow molecular weight distribution" it is meant that the resulting polymer produced in the presence of a catalyst containing both titanium and vanadium has a narrower molecular weight distribution than the polymer produced under similar conditions with a similar catalyst prepared without the vanadium component.

In the slurry process when it is desirable to produce α-olefin polymers which have a high molecular weight and a relatively broad molecular weight distribution than that produced with the catalyst containing only titanium as the transition metal, a vanadium compound can be added as a portion of the transition metal component during preparation of the catalyst. A broadening of the molecular weight distribution is indicated by an increase of the I$_{20}$/I$_2$, high load melt flow ratio (HLMFR), value of the polymer.

By the term "relatively broad molecular weight distribution" it is meant that the resulting polymer produced in the presence of a catalyst containing both titanium and vanadium has a broader molecular weight distribution than the polymer produced under similar conditions with a similar catalyst prepared without the vanadium component.

Suitable vanadium compounds which can be employed in the preparation of the transition metal catalyst include, for example, those represented by the formulas VX$_4$ and V(O)X$_3$; wherein each X is independently OR or a halogen atom, preferably chlorine; each R is independently an alkyl group having from 1 to about 20, preferably from about 2 to about 8, more preferably from about 2 to about 4, carbon atoms. Particularly suitable vanadium compounds include, for example, vanadium tetrachloride (VCl$_4$), vanadium trichloride oxide (V(O)Cl$_3$), vanadium triisopropoxide oxide (V(O)(O—i—C$_3$H$_7$)$_3$), vanadium triethoxide oxide (V(O)(OC$_2$H$_5$)$_3$), any combination thereof and the like.

Organo Halide Compounds of a Group IIIA Metal

Suitable organo halide compounds of a group IIIA Metal which can be employed in the preparation of the transition metal catalyst include, for example, those represented by the formula R'$_y$MX$_z$; wherein M is a metal from Group IIIA of the Periodic Table of the Elements, preferably aluminum or boron; each R' is independently an alkyl group having from 1 to about 20, preferably from about 1 to about 10, more preferably from about 2 to about 8, carbon atoms; X is a halogen atom, preferably chlorine; y and z each independently have a value from 1 to a value equal to the valence of M minus 1 and y+z has a value equal to the valence of M. Particularly suitable such organo halide compounds include, for example, ethylaluminum dichloride, ethylaluminum sesquichloride, diethylaluminum chloride, isobutylaluminum dichloride, diisobutylaluminum chloride, octylaluminum dichloride, any combination thereof and the like.

Component Amounts

For use in the solution process, the components are employed in quantities which provide an atomic ratio as follows:

Si and/or Al(from the inorganic oxide support):Mg of from about 1:1 to about 50:1, preferably from about 2:1 to about 40:1, more preferably from about 4:1 to about 20:1;

Mg:group IIIA metal of from about 0.01:1 to about 100:1, preferably from about 0.05:1 to about 10:1, more preferably from about 0.1:1 to about 5:1.

Mg:Ti of from about 0.05:1 to about 40:1, preferably from about 0.1:1 to about 20:1, more preferably from about 0.2:1 to about 10:1;

Mg:V, when V is present, of from about 0.05:1 to about 40:1, preferably from about 0.1:1 to about 20:1, more preferably from about 0.2:1 to about 10:1;

V:Ti of from about 0:1 to about 20:1, preferably from about 0.1:1 to about 10:1, more preferably from about 0.2:1 to about 5:1.

However, when it is desired to employ the solution process to vary the short chain branching distribution (SCBD) of ethylene/α-olefin copolymers, the V:Ti atomic ratio is from about 0.8:1 to about 1.2:1, preferably about 1:1. For making the copolymers useful for making films of the present invention which have good stretchability and puncture, the V:Ti ratio should also be from about 0.8:1 to about 1.2:1, preferably about 1:1.

For use in the suspension (slurry) process, the components are employed in quantities which provide an atomic ratio as follows:

Si and/or Al(from the inorganic oxide support):Mg of from about 1:1 to about 50:1, preferably from about 2:1 to about 40:1, more preferably from about 4:1 to about 20:1;

Mg:group IIIA metal of from about 0.01:1 to about 100:1, preferably from about 0.05:1 to about 10:1, more preferably from about 0.1:1 to about 5:1.

Mg:Ti of from about 0.05:1 to about 40:1, preferably from about 0.1:1 to about 20:1, more preferably from about 0.2:1 to about 10:1;

Mg:V, when V is present, of from about 0.05:1 to about 40:1, preferably from about 0.1:1 to about 20:1, more preferably from about 0.2:1 to about 10:1;

V:Ti of from about 0:1 to about 20:1, preferably from about 0:1 to about 10:1, more preferably from about 0:1 to about 3:1.

The compound employed as the liquid medium can be employed in any amount which provides the catalyst component with the desired consistency which does not interfere with the polymerization behavior of the catalyst.

COCATALYST or ACTIVATOR

The transition metal catalyst component described above requires a cocatalyst or activator in order to efficiently polymerize the α-olefin monomer(s). Suitable cocatalysts or activator compounds include, for example, Group IIIA metal alkyl, metal alkoxide or metal alkyl halide compounds, particularly $C_1$-$C_{10}$ alkyl compounds of aluminum. Particularly suitable such compounds include, for example, triethylaluminum, trimethylaluminum, triisobutylaluminum, trihexylaluminum, trioctylaluminum, diethylaluminum chloride, diethylaluminum ethoxide, any combination of any two or more of such compounds and the like.

Also suitable are the aluminoxanes such as those represented by the formula $(Al(O)R)_x$; wherein R is an alkyl group having from 1 to about 8 carbon atoms and x has a value greater than about 4. Particularly suitable aluminoxanes include, for example, methylaluminoxane, hexaisobutyltetraluminoxane, any combination of any two or more of such compounds and the like. Also, mixtures of these aluminoxanes with alkyl aluminum compounds such as, for example, triethylaluminum or tributylaluminum can be employed.

The cocatalyst or activator compound can be employed in the solution process in amounts which provide a ratio of atoms of Group IIIA metal per combined atoms of Ti and V of from about 0.1:1 to about 50:1, preferably from about 1:1 to about 20:1, more preferably from about 2:1 to about 15:1.

The cocatalyst or activator compound can be employed in the suspension (slurry) process in amounts which provide a ratio of atoms of Group IIIA metal per combined atoms of Ti and V of from about 1:1 to about 1000:1, preferably from about 5:1 to about 500:1, more preferably from about 10:1 to about 200:1.

Altering the Properties of Ethylene/α-olefin Copolymers by Controlling the Short Chain Branching Distribution in the Copolymer The process of the present invention differs from those of the prior art in that it describes a solution process for controlling SCBD (as measured by the z-ratio) over a wide range of melt indices and densities and yielding in all resins a narrow molecular weight distribution and small spherulite size.

According to the current invention a process for the control of the SCBD of these resins is achieved by systematic variation in the catalyst composition. This control is independent of support surface area and does not require changes in reactor temperature or deviations from optimum cocatalyst/catalyst ratio ensuring optimum catalyst productivity. The process can be used for preparing as one example cast film resins with improved stretch performance or blown film resins with improved strength properties such as dart impact.

The process of the current invention systematically varies the magnesium:titanium ratio of the silica supported catalyst to yield products of a given melt index and density with narrow molecular weight distribution and small spherulite size. The surprising results of our investigation has demonstrated that in the continuous solution process, for the preparation of a given melt index and density, systematically increasing or decreasing the magnesium:titanium ratio of the catalyst while maintaining the catalyst titanium:vanadium molar ratio at 1:1 results in a systematic broadening (i.e., decrease the Mg:Ti ratio) or narrowing (i.e., increase the Mg:Ti ratio) of the product SCBD as measured by the z ratio (z1/zo) of these resins.

The application of this process to resins of various melt index and density allows the product SCBD, z-ratio and crystallization temperature to be tailored to the specific product application with resulting improvements in resin physical properties. In the course of this investigation we have also unexpectedly discovered that variations in the catalyst yields resins, which, when made into films, demonstrate improved stretchability and puncture resistance, particularly from narrow molecular weight distribution, broader SCBD LLDPE resins.

This process is conducted at solution conditions described elsewhere in this application.

The copolymers produced by this process are ethylene/alpha olefin copolymers of the polymerizable comonomers with melt index from 0.2 to 500 grams/10 minutes (ASTM D 1238, Condition 190° C./2.16 kg), preferably from 0.4 to 100 or more preferably from 0.6 to 5; and a density from 0.8 to 0.96 g/cm³ (ASTM D 792), preferably from 0.85 to 0.94 g/cm³, more preferably from 0.90 to 0.93 g/cm³.

Fabricated articles such as molded articles (e.g., injection molded, blow molded, roto molded and compression molded parts) can be made from the copolymers produced by this invention. Of particular utility, however, are films or multilayer film structure from the copolymers of the present invention. The films or film structures can be made using any of the conventional film manufacturing processes. These include blown film, cast film and extrusion coated film processes. Especially preferred are cast films. The copolymers of the present invention can be used alone in the film (i.e., as a monolayer) or they can be used as at least one layer of a multilayer film structure. The films are usually from about 0.4 mils to about 1.2 mils in thickness, preferably about 0.8 mils. Additives can also be included in the copolymers of the present invention for use in the films. For example, additives are often included in copolymers used to make films for pallet wrapping, an especially attractive use area for the copolymers described herein. The skin layer of the pallet wrapping films might contain special additives, e.g., polyisobutylene (PIB), to enhance cling properties of the film to the goods on the pallet.

We have found that specific properties of ethylene/alpha-olefin copolymers which, when made into films for use in pallet wrapping, enhance the ultimate stretchability and puncture properties of the film. High ultimate stretchability is desired to avoid or minimize film breakage, while good puncture properties minimizes film damage. The combination of good stretchabilty and good puncture also leads to good end user economics since less film is used, thereby minimizing waste. The desired ultimate stretchability is at least about 280 percent, while maintaining a puncture of at least about 250 ft-lbs/cm$^3$. Ultimate stretchability is tested by simulated pallet wrapping conditions and is described further in this disclosure. The ethylene/alpha-olefin copolymers used to make pallet wrapping films will have a weight average molecular weight ($M_w$) to number average molecular weight ($M_n$) ratio ($M_w/M_n$) of less than about 3.6, preferably less than about 3.3, and a high density fraction greater than about 17 percent (by weight of the copolymer), preferably at least about 20 percent. The copolymers made using the catalysts and process described in the present invention which have these properties are especially effective in this stretch film application and have not been available here-to-fore. Unblended ethylene/alpha-olefin copolymers having the above specified properties are also within the scope of this invention. The term "unblended" indicates that the copolymers are made within a single reactor system and do not have other polymers blended to them to attain the properties of narrow molecular weight distribution and percent high density fraction, with the exception of additives for other reasons, e.g., PIB for cling enhancement. For this stretch film application, the copolymers preferably have a density from about 0.905 g/cm$^3$ to about 0.935 g/cm$^3$, especially from about 0.912 g/cm$^3$ to about 0.925 g/cm$^3$. The melt index of the copolymers is preferably from about 0.6 grams/10 minutes to about 6 grams/10 minutes, especially from about 1 gram/10 minutes to about 4 grams/10 minutes.

POLYMERIZABLE MONOMERS

Suitable polymerizable monomers include, for example α-olefins having from 2 to about 20, preferably from about 2 to about 12, more preferably from about 2 to about 8, carbon atoms and any combination of any two or more of such α-olefins. Particularly suitable such α-olefins include, for example, ethylene, propylene, 1-butene, 1-pentene, 4-methylpentene-1, 1-hexene, 1-heptene, 1-octene, 1-nonene, 1-decene, 1-undecene, 1-dodecene, 1-tridecene, 1-tetradecene, 1-pentadecene, any combination thereof and the like. Preferably, the α-olefins are ethylene, propene, 1-butene, 4-methylpentene-1, 1-hexene, 1-octene, and combination of any two or more of such α-olefins.

POLYMERIZATION

The catalysts of the present invention can be advantageously employed in the polymerization of monomers by the solution or slurry process.

The slurry process is employed at temperatures of from about 0° C. up to a temperature just below the temperature at which the resulting polymer becomes soluble in the inert polymerization medium, preferably at temperatures of from about 60° C. to about 105° C., more preferably from about 80° C. to about 95° C.

The solution process is employed at temperatures from the temperature at which the resulting polymer is soluble in the inert reaction medium up to about 275° C., preferably at temperatures of from about 145° C. to about 260° C., more preferably from about 180° C. to about 240° C.

The polymerization can be employed at pressures of from about 1 to about 2,000, preferably from about 5 to about 500, more preferably from about 10 to about 50, atmospheres.

Molecular weight control agents such as hydrogen can be employed in the manner known to those skilled in the art of polymerizing α-olefins. Usually the greater the amount of hydrogen or terminating agent employed the lower the molecular weight of the resulting polymer. The hydrogen is employed in that quantity which will provide the resulting polymer with the desired molecular weight as indicated by the desired $I_2$ value.

The solution polymerization can be employed in the presence of any suitable inert reaction medium such as, for example, aromatic hydrocarbons, aliphatic hydrocarbons, naphthinic hydrocarbons, combinations thereof and the like. Particularly suitable inert reaction medium include, for example, hexane, heptane, octane, isooctane, nonane, isononane, decane, undecane, dodecane, tridecane, tetradecane, cyclohexane, methylcyclohexane, combinations thereof and the like.

The suspension (slurry) polymerization can be employed in the presence of any suitable inert reaction medium such as, for example, aromatic hydrocarbons, aliphatic hydrocarbons, naphthinic hydrocarbons, liquefied α-olefins, liquefied hydrocarbons, combinations thereof and the like. Particularly suitable inert reaction medium include, for example, isobutane, isopentane, pentane, hexane, heptane, octane, isooctane, nonane, isononane, decane, cyclopentane, cyclohexane, or any combination thereof and the like.

The following examples are illustrative of the invention, but are not to be construed as to limiting the scope thereof in any manner.

The following components are employed in the examples and comparative experiments.

Silica Support #1 is a silica having a mean particle size of 3μ, a surface area of 337 m$^2$/g, subjected to heating in a fluidized bed under a nitrogen atmosphere at 600° C. for 12 hours resulting in a silica support material having a hydroxyl content of 3.2 millimoles/gram.

Silica Support #2 is a silica having a mean particle size of 70μ, a surface area of 310 m$^2$/g, subjected to heating in a fluidized bed under a nitrogen atmosphere at 600° C. for 12 hours resulting in a silica support material having a hydroxyl content of 1.9 millimoles/gram.

Silica Support #3 is a sieve fraction of a silica having a mean particle size of 145μ, a surface area of 310 m$^2$/g, subjected to heating in a fluidized bed under a nitrogen atmosphere at 800° C. for 12 hours resulting in a silica support material having a hydroxyl content of 1.8 millimoles/gram.

Silica Support #4 is a sieve fraction of a silica having a mean particle size of 85μ, a surface area of 310 m$^2$/g, subjected to heating in a fluidized bed under a nitrogen atmosphere at 800° C. for 12 hours resulting in a silica support material having a hydroxyl content of 1.8 millimoles/gram.

Silica Support #5 is a sieve fraction of a silica having a mean particle size of 40μ, a surface area of 310 m$^2$/g, subjected to heating in a fluidized bed under a nitrogen atmosphere at 800° C. for 12 hours resulting in a silica support material having a hydroxyl content of 1.8 millimoles/gram.

Silica Support #6 is a sieve fraction of a silica having a mean particle size of 3μ, a surface area of 310 m²/g, subjected to heating in a fluidized bed under a nitrogen atmosphere at 800° C. for 12 hours resulting in a silica support material having a hydroxyl content of 1.8 millimoles/gram.

Silica Support #7 is a small size silica having a mean particle size of 3μ, a surface area of 430 m²/g, subjected to heating in a rotary kiln under a nitrogen atmosphere at 800° C. for 5 hours resulting in a silica support material having a hydroxyl content of 2.8 millimoles/gram.

ISOPAR ™ E is a fractionated isoparaffinic solvent having a boiling range of 113° C.–143° C. available from Exxon Corporation.

Basic physical testing (including melt index, $I_2$, $I_{10}/I_2$, and density are performed on each sample using standard ASTM methods as follows: melt index ($I_2$) by ASTM D 1238, Condition 190° C./2.16 kg; melt index ($I_{10}$) by ASTM D 1238, Condition 190° C./10 kg; melt index ($I_{20}$) by ASTM D 1238, Condition 190° C./20kg; density by ASTM D 792. Melting point is determined using differential scanning calorimetry (DSC).

The molecular weight of the resultant polymers is also determined via gel permeation chromatography (GPC) employing a Waters 150C high temperature chromatographic unit equipped with three mixed porosity columns (Polymer Laboratories $10^3$, $10^4$, $10^5$, and $10^6$), operating at a system temperature of 140° C. The solvent is 1,2,4-trichlorobenzene, from which 0.3% by weight solutions of the samples are prepared for injection. The flow rate is 1.0 milliliter/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science*, Polymer Letters. Vol. 6, (621) 1968, incorporated herein by reference) to derive the equation:

$$M_{polyethylene} = a * (M_{polystyrene})^b$$

In this equation, a=0.4316 and b=1.0. Weight average molecular weight, $M_w$, is calculated in the usual manner according to the formula:

$$M_w = R\ w_i * M_i$$

where $w_i$ and $M_i$ and are the weight fraction and molecular weight respectively of the ith fraction eluting from the GPC column.

The onset of crystallization and crystallization kinetics of each resin is determined by measuring the transmission of plane polarized light through a sample melted at 180° C. and allowed to cool to 70° C. at a rate of 10° C./min.

The Short Chain Branching Distribution (SCDB) and percent high density fraction of each resin is determined by Analytical Temperature Rising Elution Fractionation (ATREF), as described in U.S. Pat. No. 4,798,081 and in *Journal of Applied Polymer Science*, Applied Polymer Science Symposia 45, 25–37 (1990) entitled "Determination of Short-Chain Branching Distributions of Ethylene Copolymers by Automated Analytical Temperature Rising Elution Fractionation (AUTO-ATREF)", by Lonnie G. Hazlitt, the disclosures of both of which are incorporated herein by reference. ATREF separates the polymer according to crystallinity. The experimental procedure for determining short chain branching distribution and high density fraction is as follows:

I. TREF Device Design

A process control gas chromatograph (GC) analyzer is used as the basis of the design and functions as a computer controlled event sequencer and multiple GC oven programmer. The GC uses digital I/O to operate pneumatic solenoids, operate other pneumatic equipment and detect the states of various digital switches. The GC primary components includes two large, forced air, isothermal (135° C.) ovens and four smaller, programmable, forced air GC ovens. The GC ovens are operated by vendor supplied software to control the temperature profiles. The software includes other program instructions and consists of a fixed sequence of timed events to provide the necessary control for automation. A five mil sample loop consisting of 1/16 inch ID stainless steel tubing is used to temporarily receive the freshly injected polymer solution. A syringe-pump assembly provides the necessary vacuum to move polymer solution into the sample loop. The syringe pump assembly uses a 5-ml syringe barrel and an air cylinder to drive the plunger. A separate injector head assembly is used to place the needle into the solution of polymer for subsequent removal. This assembly behaves as a valve, since when the needle is down, no flow is possible, and when the valve is up it is actually part of the flow path. The polymer solutions are introduced to the system via a sample carousel assembly.

Attached to the lower oven are the four programmable GC ovens. In each of these ovens is a small ATREF column constructed of ⅛ inch thin-wall, stainless-steel tubing. These are packed with stainless-steel shot. The total interstitial volume of the columns is 1.5 mL. The solvent and polymer solution is directed, via a heated transfer line, to a single-beam infrared detector set to 3.5 microns. The detector is equipped with a high temperature, flow-through sample cell containing zinc selenide windows spaced to give a 0.1 cm path length. Other detectors including refractive index and viscometers can be used (but are not discussed here). A reservoir for solvent waste is provided after the detector.

In addition to the analyzer computer which operated the system, a separate personal computer is used as a data system. The software on this latter system includes various data acquisition routines for digitally storing signals from the ATREF instrument and data reductions routines to transform this digitally recorded data into meaningful graphs and reports. Various voltages from the ATREF instrument are measured digitally. These include the infrared detector output, other mass detectors, and thermocouple outputs from each of the GC ovens.

The copolymer solutions are prepared in TCB at about 0.6 percent by weight and heated to 160° C. to ensure homogeneity. These solutions are placed into 15 mL vials with open-holed caps fitted with Teflon septa, then placed into the carousel. The carousel is placed in the upper oven and the analyzer computer is then started. The operation is then fully automated for the next 48 hours, provided data collection routines are initiated on the data system and an adequate solvent supply is available.

The operation of the instrument consists of a sequence of four identical program modules executed on the analyzer computer. The only difference among these modules is the GC oven on which each operates. Each module consists of a sequence of timed events, e.g., VALVE 1 ON, VALVE 5 OFF, TEMPERATURE PROGRAM 1, etc. For simplicity the operation of only one program module (operating on GC oven 1) is described, with the understanding that continuous operations requires the use of all four program modules.

It will be assumed that GC oven 1, initially at 24° C., contains a previously precipitated copolymer and that the oven is now ready for elution. This means the instrument has been running for some time and the precipitated polymer in the column is from a previous injections. Valve 1, valve 5, and valves 7 through 10 are closed. Valve 4 and valve 6 are open. The flow (1.5 mL/min) is bypassing the upper oven and all of the GC ovens. The detector is in a baseline condition and only pure TCB is moving through the system.

The first step in each program module is to notify the data system via a set of contact closures that an elution step is being initiated. The next step is to open valve 7 above GC oven 1 and close valve 6. As the fresh solvent enters GC oven 1, it displaces the solvent left in the column during the precipitation of the polymer solution. In nearly all cases there is a fraction of the polymer which does not precipitate, even at 24° C. As the displaced solvent exits the oven it is directed into the IR detector. After the initial column contents are eluted and the IR detector has returned to a baseline condition, GC oven 1 is subjected to a temperature program of +1.5° C./min. A continuous response is produced in the IR which is proportional to the concentration of the eluting polymer in solution. This detector response and the response from an internal thermocouple are recorded on the data system as a function of time.

After GC oven 1 has reached 122° C., the elution step is assumed to be complete. The solvent flow is maintained as above while in the upper oven, valve 2 is opened, and valve 3 is closed. The carousel is advanced one position. The syringe needle within the injector head is lowered. The syringe pump is pulled down and polymer solution is pulled into the sample loop. The sample loop is sufficiently large to prevent any of the solution from entering the syringe pump mechanism. A 5 minute delay is included to ensure that solutions with a range of viscosities will have time to fill the loop.

The next steps are to load the column in GC oven 1 and reset the injector components to their initial states. Valve 2 is closed, the needle is raised, valve 3 is opened, and the syringe pump is forced upwards, expelling excess TCB to waste. Valve 1 and valve 5 are opened and valve 4 is closed. The polymer solutions located in the sample loop moves under nearly plug flow conditions toward GC oven 1, maintained at 122° C. At the approximate time that the moving plug of polymer solution is centered over the column in GC oven 1, valve 6 is opened and valve 7 is closed. The portion of the moving 5-mL column will now be isolated from the flow and remain behind as the excess solution is flushed out of the system. This condition is maintained for 30 minutes to ensure that the upper ovens are well flushed with fresh solvent.

Three temperature programs for GC oven 1 are initiated. First is a quick cool from 122° C. to 106° C. at −10° C./min. Next, a temperature program is started form 106° C. at −0.1° C./min. At this rate the total cool down would require in excess of 13 hours to complete. This time is shortened somewhat by the final temperature program of −0.3° C./min, which starts when the oven temperature reaches 50° C. The total cool down time requires about 10.5 hours; and since each of the program modules is only a little over 3 hours, the last temperature program referred to above (−0.3° C./min.) actually resides in the program module operating on GC oven 4. Near the end of each program module the valves are returned to the initial conditions described at the beginning of this section in preparation for the next module. The subsequent modules are identical except they operate on successive GC ovens.

The digitized ATREF data are a record of the IR detector response and the column temperature as a function of time. The data reduction routine includes baseline subtraction, conversion to the temperature domain, smoothing, normalization and plotting the data.

The bimodality of the distributions is characterized by the weight fraction of the highest temperature peak. This fraction is referred to as the high-density fraction, since it contains little or no short-chain branching. The remaining fraction is therefore logically referred to as the SCB fraction, since it represents the fraction which contains nearly all the short-chain branching inherent to the copolymer.

The advantage of the IR detector tuned to the carbon stretching frequency is that the detector response is more nearly uniform, so that low levels of additives do not appreciable interfere with the measurement of the "purge" peak. The fraction of "purge" is represented in the rectangular area near 25° C. The copolymer in this fraction contains very high levels of SCB. The copolymers used in making the novel films described herein have broad short chain branching distributions. This means that the copolymers contain comparatively larger high density and purge fractions and comparatively less intermediately branched material than less preferred copolymers. A copolymer having a SCBD with greater than about 17 percent high density fraction is especially preferred, and a SCBD with at least about 20 percent high density fraction is most preferred.

D. Branching Content Determination

Branching content (i.e., degree of branching) is calculated from $CH_3/1000\ C$ (methyls/1000 carbons) determination according to ASTM method D2238-68. A Beckman 4260 infrared spectrophotometer is employed, using films of approximately 0.15 mm thickness. A correction for chain end methyl groups is necessary for accurately determining weight percent comonomer (e.g., 1-octene) incorporation. The correction is done according to the following equation:

$$\text{Corrected } CH_3/1000\ C = \text{Uncorrected } CH_3/1000\ C + \frac{\text{Vinyl}}{1000\ C} - \frac{28000}{M_n}$$

Comonomer incorporation can be determined from the following equation:

Wt. % octene =

-continued $$\frac{(\text{Molecular Weight of 1-octene})(\text{Corrected CH}_3/1000\ \text{C})(100)}{14000 + 84(\text{corrected CH}_3/1000\ \text{C})}$$

The width of the SCBD is described using the z value, the calculation of which for a fraction of a whole polymer crystallized at its crystallization temperature Tc may be obtained by determining the fraction of methyls/1000 carbons by 13 C NMR (corrected for chain ends i.e. molecular weight) and calculating the mole fraction of the average sequence length of methylene units as shown below where m is the carbon number of the comonomer, Mn is the number average molecular weight and x is number of methyls/1000 carbons (corrected):

$$z = \{1 - (x(m-1)/1000 + 28/Mn)\}1000/(x+1)$$

If this calculation is repeated for a fraction across the Tc range of the whole polymer, the new distribution reflects the weight fraction of polymer (from ATREF) as a function of average crystallizable segment mole fraction. Two moments can then be defined:

$$z_0 = (E_{w_i}/z_i) - 1$$

and $$z_1 = E_{w_i} \times z_i$$

where wi is the weight percent of the ith fraction and zi is the value of z calculated from the observed Tc for the ith fraction. For the polymers of the current invention, the weight fraction at each Tc is determined by ATREF and the corrected methyls per 1000 carbons for each Tc is determined using a previously determined calibration curve of Tc vs methyls/1000 carbons obtained from fractions of the same product type.

Morphological analysis is carried out using a Nikon Polarizing Microscope (Optiphot-Pol) equipped with an analyzer and a polarizer. Sample preparation involved melting the sample at 180° C. and allowed to cool to 70° C. at a rate of 10° C./min. When cool the sample is placed on a microscope slide and the pictures are taken using a 35 mm camera which is attached to the phototube. The filter holder is positioned directly next to the light source to avoid any flare of false images from the filter surface while taking pictures. Photographs are taken using objective lenses which resulted in a magnification of 200×.

Polymerization (Solution Conditions)

A stirred, one-gallon (3.79L) autoclave reactor is charged with two liters of ISOPAR TM E and the required amount of the alpha-olefin comonomer, octene-1, in an amount such that its molar concentration in the reactor is 0.99M before heating to the desired temperature. The required amount of hydrogen, 2 psig (13.8 kPa), is then added to the reactor followed by ethylene sufficient to bring the total pressure to 450 psig (3,103 kPa). An amount of the activated catalyst is injected into the reactor. The reactor temperature and pressure are maintained constant at the initial pressure and temperature, as indicated, by continually feeding ethylene during the polymerization run and cooling the reactor as necessary. After a 10 minute reaction time (unless otherwise indicated), the ethylene is shut off and the hot solution transferred into a nitrogen-purged resin kettle. After drying, the samples are then weighed to determine catalyst efficiencies followed by melt flow and density measurements via standard procedures.

Polymerization (Slurry Conditions)

A stirred, 1.4 liter autoclave reactor charged with 700 mL of ISOPAR TM E before heating to the desired temperature. The vapor space is swept with hydrogen and then hydrogen is added to the reactor until the desired partial pressure is reached. This is followed by ethylene sufficient to bring the total pressure to 175 psig (1,207 kPa). An amount of the activated catalyst as described under preparation of activated catalyst is injected into the reactor. The reactor temperature and pressure are maintained constant at the initial pressure and temperature by continually feeding ethylene during the polymerization run and cooling the reactor as necessary. After a 45 minute reaction time (unless otherwise indicated), the ethylene is shut off and the polymer slurry transferred into a nitrogen-purged resin kettle. After drying, the samples are then weighed to determine catalyst efficiencies followed by melt flow and density measurements.

EXAMPLE 1

A. Preparation of Transition Metal Catalyst Component

To 1 g of Silica Support #1 slurried in 50 ml of ISO-PAR TM E is added the required amount of butyloctylmagnesium ethoxide (BOMAG-O from Schering A.G.). The resulting slurry is stirred for 1 hour after which an amount of titanium tetrachloride (TiCl4) is added. The slurry rapidly darkens to a deep brown color and is stirred for a further two hours. An aliquot of a solution of 25% ethylaluminum dichloride is then added and and the final mixture stirred for 17 hours. The complete mixtures prepared in this manner are used without further isolation or washing. The catalysts have the atomic ratios as indicated in Table I.

B. Preparation of Activated Catalyst

An activated catalyst is prepared by slurrying 4 mL of the transition metal catalyst component in 40 mL of ISOPAR TM E in a 100 mL septum-capped bottle in a glove box. To this mixture is added the required amount of 0.15M solution of triethylaluminum in hexane as a cocatalyst or activator. The resulting slurry is made up to 50 mL total volume with ISOPAR TM E and the mixture injected into the batch reactor to effect the polymerization. The atomic ratio of Al from the cocatalyst to titanium is provided in Table I.

C Polymerization (Solution Conditions)

The polymerization procedure under solution conditions is employed at a polymerization temperature of 185° C. The catalyst efficiency is provided in Table I.

D. (Comparative)

A catalyst is prepared as described in U.S. Pat. No. 4,562,169 in the following manner.

Davison Silica Gel, Grade 952, is dehydroxylated by fluidizing with nitrogen and heating at 800° C. for 12 hours and cooled to room temperature under nitrogen.

10 grams of the activated silica is slurried in 100 mL of anhydrous degassed hexane, brought to a reflux temperature of 60° C. and 7 mL of a 2.6M solution of ethylmagnesium chloride in tetrahydrofuran (THF) added slowly followed by further refluxing for 120 minutes. The solvents are removed by distillation and the silica dried at 80° C. under a nitrogen purge.

This product is slurried with a premixed solution of 6 mL of TiCl4 dissolved in 100 mL of Isopar TM E and the slurry stirred at 50° C. for two hours. This mixture is allowed to cool to room temperature and the solids washed twice with 100 mL portions of Isopar TM E and twice with 100 mL portions of hexane and dried under a nitrogen purge to yield a tan colored free-flowing powder. Analysis of the powder indicates that it contains 1.3 mmol/g Mg/g catalyst, 0.9 mmol Ti/g catalyst and 4.5 mmol Cl/g catalyst. The catalyst is then combined with triethylaluminum (TEA) activator (cocatalyst) by slurrying 2 g of the dry catalyst in 40 ml of Isopar TM E in a 4 oz (118.3 mL) septum capped bottle in a glove box. A 2 mL aliquot of this solution is transferred to a second bottle to which is added the required amount of a 0.15M solution of triethylaluminum in hexane followed by an additional 20 mL of Isopar TM E. The required amount of this slurry is then injected into a batch reactor to effect the polymerization under solution conditions at 175° C. as described earlier. The catalyst efficiency and product data are shown in Table I.

B. Polymerization

The polymerizations are conducted under solution process conditions at 185° C. The results of the polymerization reactions are shown in Table II.

TABLE II

| Effect of Silica Particle Size on Solution Polymerizations | | | | | |
|---|---|---|---|---|---|
| Run No. | Support No. | Size $\mu$ | Density g/cc | $I_2$ | Efficiency (Kg Polymer per gram Ti or Cl) Ti | Cl |

| Run No. | Support No. | Size $\mu$ | Density g/cc | $I_2$ | Ti | Cl |
|---|---|---|---|---|---|---|
| A* | 3 | 145 | 0.9080 | 1.16 | 49 | 30 |
| B* | 5 | 40 | 0.9119 | 1.05 | 499 | 35 |
| C | 6 | 3 | 0.9159 | 1.13 | 842 | 60 |

*Not an example of the present invention.

EXAMPLE 3

A. Preparation of Transition Metal Catalyst Component

To 1 g of the indicated silica support of different mean particle sizes slurried in 50 ml of ISOPAR TM E is added 2.0 mmol of butylethylmagnesium butoxide (BEMB from Texas Alkyls Inc). The resulting slurry is

TABLE I

| Run No. | Catalyst Source | mmol Mg | mmol Ti | mmol Al | mmol Cl | Atomic Ratio Mg/Al$^a$/Cl/Ti | Atomic Ratio of Al$^b$/Ti | Efficiency (Kg Polymer per gram Ti or Cl) Ti | Cl |
|---|---|---|---|---|---|---|---|---|---|
| A | Ex 1-B | 1.4 | 0.4 | 4.5 | 10.6 | 3.5/11.3/26.5/1 | 11/1 | 478 | 24 |
| B | Ex 1-B | 1.9 | 0.4 | 4.5 | 10.6 | 4.8/11.3/26.5/1 | 6/1 | 627 | 28 |
| C | Ex 1-B | 1.8 | 0.2 | 3.5 | 9.4 | 3.0/5.8/15.7/1 | 5/1 | 413 | 27 |
| D | Ex 1-D | 1.3 | 0.9 | — | 4.5 | — | 5/1 | 30 | 8 |

$^a$Aluminum from transition metal catalyst component.
$^b$Aluminum from cocatalyst.

EXAMPLE 2

A. Preparation of Transition Metal Catalyst Component

To a 1 g sample of the support designated in Table II slurried in 50 mL of ISOPAR TM E is added 2.0 mmol of butylethylmagnesium butoxide (BEMB from Texas Alkyls Inc.). The mixture is stirred for one hour and treated sequentially with 1.0 mmol TiCl4 and 1.0 mmol V(O)Cl3 as a neat mixture and 6.0 mmol of ethylaluminum dichloride (4.0 mL of a 1.5M solution in hexane). The mixture is diluted to 100 mL total volume and then stirred for 24 hours. The atomic ratios of the components in the transition metal complex are Mg/Al/Cl/Ti/V is 2/6/19/1/1. The catalyst components are activated (use of cocatalyst) according to the procedure described in Example 1 employing Al (activator)/Ti ratio of 8/1.

stirred for 1 hour after which 0.20 mmol of titanium tetraisopropoxide is added. The slurry is stirred for a further two hours. An aliquot of a solution of 25% ethylaluminum dichloride (4.0 mmol Al) is then added and the final mixture stirred for 17 hours. The complete mixtures prepared in this manner are used without further isolation or washing. The atomic ratios of Mg/Al/Cl/Ti are 10/20/40/1.

The catalysts are activated with triisobutylaluminum at an atomic ratio of Al/Ti of 100/1 by the procedure described in Example IB.

B. Polymerization

The polymerizations are conducted under slurry conditions using a hydrogen to ethylene ratio of 1:1 and a reactor temperature of 85° C. The results of the polymerization reactions are shown in Table III.

TABLE III

| Effect of Silica Particle Size on Slurry Polymerizations | | | | | | | | |
|---|---|---|---|---|---|---|---|---|
| Run No. | Catalyst Support # | Size ($\mu$) | Atomic Ratios Transition Metal Catalyst Component Mg/Al/Cl/Ti | Si/Mg | Cocat. Al/Ti | $I_2$ | $I_{20}/I_2$ | Efficiency (Kg Polymer per gram of Ti or Cl) Ti | Cl |

| Run No. | # | ($\mu$) | Mg/Al/Cl/Ti | Si/Mg | Al/Ti | $I_2$ | $I_{20}/I_2$ | Ti | Cl |
|---|---|---|---|---|---|---|---|---|---|
| A* | 3 | 145 | 10/20/40/1 | 8.3 | 100:1 | 0.40 | 42.8 | 531 | 18 |
| B* | 4 | 85 | 10/20/40/1 | 8.3 | 100:1 | 0.33 | 34.7 | 727 | 24 |
| C* | 5 | 40 | 10/20/40/1 | 8.3 | 100:1 | 0.48 | 36.9 | 575 | 19 |
| D | 6 | 3 | 10/20/40/1 | 8.3 | 100:1 | 0.37 | 38.7 | 1,500 | 51 |
| E | 7 | 3 | 10/20/40/1 | 8.3 | 100:1 | 0.30 | 34.2 | 1,510 | 51 |

*Not an example of the present invention.

EXAMPLE 4

A. Preparation of Transition Metal Catalyst Component

To 1 g of Silica Support #7 slurried in 50 ml of ISO-PAR ™ E is added 2.0 mmol of butylethylmagnesium butoxide (BEMB from Texas Alkyls Inc). The resulting slurry is stirred for 1 hour after which 0.20 mmol of titanium tetrachloride (TiCl$_4$) is added. The slurry rapidly darkens to a deep brown color and is stirred for a further two hours. An aliquot of a solution containing an alkylaluminum chloride (3.5 mmol Al) is then added and the final mixture stirred for 17 hours. The complete mixtures prepared in this manner are used without further isolation or washing.

The catalysts are activated with triisobutylaluminum at a ratio of Al/Ti of 100/1 employing the procedure of Example 1B.

B. Polymerization

The polymerizations are conducted under slurry conditions using a hydrogen to ethylene ratio of 1:1, a reactor temperature of 85° C. and a polymerization time of one hour. The results of the polymerization reactions are shown in Table IV.

TABLE IV

| | | Effect of different Alkylaluminum Halides | | | | | | |
|---|---|---|---|---|---|---|---|---|
| | | Atomic Ratios | | | Efficiency | | | |
| Run | Aluminum | Catalyst | | Cocat. | (Kg PE per gram of Ti or Cl) | | | |
| No. | Source | Mg/Al/Cl/Ti | Si/Mg | Al/Ti | Ti | Cl | I$_2$ | I$_{20}$/I$_2$ |
| A | EtAlCl$_2$[a] | 10/17.5/39/1 | 8.3 | 100/1 | 1,150 | 40 | 0.71 | 24.7 |
| B | Et$_3$Al$_2$Cl$_3$[b] | 10/17.5/30.3/1 | 8.3 | 100/1 | 986 | 44 | 0.80 | 31.8 |
| C | iBuAlCl$_2$[c] | 10/17.5/39/1 | 8.3 | 100/1 | 1,010 | 38 | 0.69 | 30.0 |

[a] Ethylaluminum dichloride.
[b] Ethylaluminum sesquichloride.
[c] Isobutylaluminum dichloride.

EXAMPLE 5

A. Preparation of Transition Metal Catalyst Component

To 1 g of Silica Support #7 slurried in 50 ml of ISO-PAR ™ E is added 2.0 mmol of butylethylmagnesium butoxide (BEMB from Texas Alkyls Inc). The resulting slurry is stirred for one hour after which an amount of titanium tetraisopropoxide is added. The slurry is stirred for a further two hours. An aliquot of a solution of 25% ethylaluminum dichloride in hexane is then added and and the final mixture is stirred for 17 hours. The complete mixtures prepared in this manner are used without further isolation or washing.

The catalysts are activated with triisobutylaluminum at the ratio given in Table V.

B. Polymerization (Slurry Conditions)

The polymerization is conducted under slurry polymerization conditions employing a temperature of 85° C., a hydrogen to ethylene ratio of 1:1 and a polymerization time of one hour.

The results are shown in Table V.

TABLE V

| | Effect of Varying Amount of Titanium and Cocatalyst | | | | |
|---|---|---|---|---|---|
| | Atomic Ratios | | | Efficiency (Kg PE per gram of Ti or Cl) | |
| Run | Catalyst | | Cocat. | | |
| No. | Mg/Al/Cl/Ti | Si/Mg | Al/Ti | Ti | Cl |
| A | 6.7/15/30/1 | 8.3/1 | 25/1 | 1,150 | 52 |
| B | 6.7/11.7/23.3/1 | 8.3/1 | 100/1 | 1,100 | 64 |
| C | 10/35/70/1 | 8.3/1 | 100/1 | 2,140 | 41 |

EXAMPLE 6

A. Preparation of Transition Metal Catalyst Component

To 1 g of Silica Support #7 slurried in 50 ml of ISO-PAR ™ E is added 2.0 mmol of butylethylmagnesium butoxide (BEMB from Texas Alkyls Inc). The resulting slurry is stirred for 1 hour after 0.20 mmol of titanium tetraisopropoxide (Ti(O—iC$_3$H$_7$)$_4$) is added. The slurry is stirred for a further two hours. An aliquot of a solution of 25% ethylaluminum dichloride (4.5 mmol) is then added and the final mixture stirred for 17 hours. The complete mixtures prepared in this manner are used without further isolation or washing. The atomic ratio for the catalysts are given in Table VI.

The catalysts are activated with triisobutylaluminum at an Al/Ti ratio of 200:1.

B. Polymerization (Slurry Conditions)

The polymerization is conducted under slurry polymerization conditions employing a temperature of 85° C., a hydrogen to ethylene ratio of as indicated in the Table, a pressure of 170 psi (1,172 kPa), and a polymerization time of one hour. Various solvents are employed as the polymerization medium. The results are given in Table VI.

TABLE VI

| | Use of Different Solvents as a Polymerization Medium and different Hydrogen to Ethylene Ratios. | | | | | | | | |
|---|---|---|---|---|---|---|---|---|---|
| | | Atomic Ratios | | | | | | Efficiency | |
| Run | | Catalyst | | Cocat. | Ratio of | | | (Kg Polymer per gram of Ti or Cl) | |
| No. | Solvent | Mg/Al/Cl/Ti | Si/Mg | Al/Ti | H$_2$ to C$_2$H$_4$ | I$_2$ | I$_{20}$/I$_2$ | Ti | Cl |
| A | n-C$_6$H$_{14}$ | 10/22.5/45/1 | 8.3/1 | 200/1 | 0.36 | 0.19 | 39.5 | 1,020 | 31 |
| B | i-C$_5$H$_{12}$ | 10/22.5/45/1 | 8.3/1 | 200/1 | 3.0 | 0.67 | 38.5 | 750 | 22 |

EXAMPLE 7

A. Preparation of Transition Metal Catalyst Component Containing Vanadium

To 1 g of Silica Support #7 slurried in 50 ml of ISO-PAR ™ E is added 2.0 mmol of butylethylmagnesium butoxide (BEMB from Texas Alkyls Inc). The resulting slurry is stirred for one hour after which 0.40 mmol of titanium tetrachloride (TiCl$_4$) is added. The slurry rapidly darkens to a deep brown color and is stirred for a further two hours. An aliquot of a solution of ethylaluminum dichloride (3.5 mmol Al) is then added and the final mixture stirred for 17 hours. The mixture is treated with 0.40 mmol of vanadium trichloride oxide (VOCl$_3$) and then stirred for 4 hours. The Mg/Al/Cl/V/Ti atomic ratios of the catalyst is 5/8.8/20.3/1/1. The Si/Mg atomic ratio of the catalyst is 8.3/1.

The catalyst is activated with triisobutylaluminum at an Al/Ti atomic ratio of 100:1.

B. Polymerization (Slurry Conditions)

The slurry polymerization conditions are employed. The polymerization temperature is 85° C., the hydrogen to ethylene ratio is 2:1, and the polymerization time is one hour.

The polymerization efficiency based on titanium is found to be 952 Kg PE/g Ti and the polymerization efficiency based on chloride is 52 Kg PE/g Cl and the polymerization efficiency based on titanium plus vanadium is 476 Kg PE/g Ti+V.

EXAMPLE 8

A. Preparation of Transition Metal Catalyst Component Containing Vanadium

To 1 g of Silica Support #7 slurried in 50 ml of ISOPAR ™ E is added 2.0 mmol of butylethylmagnesium butoxide (BEMB from Texas Alkyls Inc.). The resulting slurry is stirred for one hour after which 1.80 mmol of titanium tetrachloride (TiCl$_4$) is added. The slurry rapidly darkened to a deep brown color and is stirred for a further two hours. An aliquot of a solution of ethylaluminum dichloride (3.5 mmol Al) is then added and and the final mixture stirred for 17 hours. The mixture is treated with 0.40 mmol of vanadium trichloride oxide (VOCl$_3$) and then stirred for 4 hours. The Mg/Al/Cl/V/Ti atomic ratios of the catalyst is 1.1/1.9/12.3/0.2/1. The Si/Mg atomic ratio of the catalyst is 8.3/1.

The catalyst is activated with triisobutylaluminum at an atomic ratio of Al/Ti of 100/1.

B. Polymerization (Slurry Conditions)

The slurry polymerization procedure is employed using a hydrogen to ethylene mole ratio of 1 to 1, a polymerization temperature of 85° C., and a polymerization time of one hour.

The efficiency of the catalyst based on titanium is 571 Kg PE/g Ti/hour and the efficiency based on chloride is 90 Kg PE/g Cl and the efficiency based on titanium plus vanadium is 285 Kg/ g of Ti+V/hour.

EXAMPLE 9

A. Preparation of Transition Metal Catalyst Component Containing Vanadium

To 1 g of Silica Support #7 slurried in 50 ml of ISOPAR ™ E is added 2.0 mmol of butylethylmagnesium butoxide (BEMB from Texas Alkyls Inc). The resulting slurry is stirred for 1 hour after which 1.00 mmol of titanium tetrachloride (TiCl$_4$) is added. An aliquot of a solution of ethylaluminum dichloride (6.0 mmol Al) is then added and and the final mixture stirred for 17 hours. The mixture is treated with 1.00 mmol of vanadium trichloride oxide (VOCl$_3$) and then stirred for 4 hours. The complete mixtures prepared in this manner are used without further isolation or washing. The Mg/Al/Cl/V/Ti atomic ratios of the catalyst is 2/6/19/1/1. The Si/Mg atomic ratio of the catalyst is 8.3/1.

The catalysts are activated with the cocatalyst designated in Table VII.

B. Polymerization (Slurry Conditions)

The slurry polymerization procedure is employed at a temperature of 85° C. a hydrogen to ethylene ratio of 1:1, and a polymerization time of one hour.

The catalyst efficiency and properties of the resulting polymer are shown in Table VII.

TABLE VII

Use of Varying Amounts of Vanadium

| Run No. | Cat. No. | Bu$_3$Al TO Ti Ratio | Efficiency (Kg PE per gram of Ti or Cl) | | | $I_2$ | $I_{20}/I_2$ |
| --- | --- | --- | --- | --- | --- | --- | --- |
| | | | Ti | Cl | Ti + V | | |
| A | 9A | 100 | 433 | 31 | 216 | 0.12 | 60.0 |
| B | 9B | 200 | 433 | 31 | 216 | 0.12 | 60.3 |
| C | 9C | 50 | 325 | 23 | 163 | 0.09 | 57.8 |

This Example 9 shows that high $I_{20}/I_2$ ratios can be achieved with the vanadium containing catalysts in slurry polymerizations. These high $I_{20}/I_2$ ratios are indicative of a broad molecular weight distribution.

EXAMPLE 10

A. Preparation of Transition Metal Catalyst Component

To 1 g of Silica Support #7 slurried in 50 ml of ISOPAR ™ E is added 2.0 mmol of butylethylmagnesium butoxide (BEMB from Texas Alkyls Inc). The resulting slurry is stirred for one hour after which titanium tetraisopropoxide is added in the indicated quantities. The slurry is stirred for a further two hours. An aliquot of a solution of 25% ethylaluminum dichloride in hexane is then added and the final mixture stirred for 17 hours. The atomic ratios of Mg/Al/Cl/Ti for these catalysts are as follows:

Run A=7.5/15/30/1
Run B=3.8/8.8/17.5/1

The atomic ratios of Si/Mg for these catalysts are as follows:

Run A=8.3/1
Run B=8.3/1.

The catalysts prepared in this manner are used without further isolation or washing.

The catalysts are activated with triethylaluminum at atomic ratios of Al/Ti of 8/1 and 6/1.

B. Polymerization (Solution Conditions)

The catalysts are used to polymerize ethylene using the solution polymerization procedure employing a polymerization temperature of 185° C., and a polymerization time of one hour.

The results are given in Table VIII.

TABLE VIII

| Run No. | Catalyst (millimoles) | | Cocat. Atomic Ratio Al/Ti | Efficiency (Kg PE per g Ti or Cl) | |
| --- | --- | --- | --- | --- | --- |
| | Ti | Al | | Ti | Cl |
| A | 0.20 | 3.0 | 8 | 773 | 35 |
| B | 0.40 | 3.5 | 6 | 641 | 50 |

EXAMPLE 11

A. Preparation of Catalyst

To 1 g of Silica Support #7 slurried in 50 ml of ISOPAR TM E is added the required amount of butylethylmagnesium butoxide (BEMB from Texas Alkyls Inc). The resulting slurry is stirred for one hour after which titanium tetrachloride (TiCl4) is added. An aliquot of a solution of ethylaluminum dichloride (EADC) is then added and the slurry stirred for 17 hours. The mixture is treated with vanadium tetrachloride (VCl4) and then stirred for 4 hours. The complete mixtures prepared in this manner are used without further isolation or washing. The composition of these catalysts are given in Table IX. The atomic ratios are given in Table IX.

B. Activation and Polymerization

After activating the catalysts prepared above with triethylaluminum in the indicated amounts, polymerizations are conducted under solution polymerization conditions at a polymerization temperature of 185° C. and a polymerization time of ten minutes.

The results ar given in Table IX.

TABLE IX

| Run No. | mmol BEMB | mmol TiCl4 | mmol VCl4 | mmol EADC | Atomic Ratios Catalyst Mg/Al/Cl/V/Ti | Si/Mg | Cocat Al/Ti | Density g/cm³ | I2 | Catalyst Efficiency Kg PE/g Ti or Cl Ti | Cl |
|---|---|---|---|---|---|---|---|---|---|---|---|
| A | 1.2 | 0.2 | 0.2 | 1.5 | 6/7.5/23/1/1 | 14/1 | 9.4 | 0.9334 | 3.45 | 552 | 32 |
| B | 1.2 | 0.6 | 0.2 | 1.5 | 2/2.5/10/0.33/1 | 14/1 | 6.2 | 0.9314 | 3.74 | 593 | 77 |
| C | 1.5 | 0.4 | 0.4 | 2.5 | 3.8/6.3/20.5/1/1 | 17/1 | 4.7 | 0.9250 | 1.24 | 1,096 | 72 |
| D | 1.8 | 0.6 | 0.6 | 3.5 | 3/6/20/1/1 | 21/1 | 6.7 | 0.9241 | 1.81 | 1,021 | 70 |
| E | 1.2 | 0.6 | 0.6 | 3.5 | 2/6/20/1/1 | 14/1 | 8.3 | 0.9228 | 1.16 | 958 | 66 |
| F | 1.2 | 1.0 | 1.0 | 3.5 | 1.2/3.5/15/1/1 | 14/1 | 8.3 | 0.9285 | 1.21 | 1,157 | 104 |
| G | 1.2 | 1.2 | 1.2 | 3.5 | 1/3/14/1/1 | 14/1 | 8.3 | 0.9232 | 1.84 | 807 | 79 |
| H | 1.2 | 0.6 | 0.2 | 3.5 | 2/7/19/0.3/1 | 14/1 | 8.3 | 0.9226 | 1.47 | 1,002 | 80 |

EXAMPLE 12

A. Preparation of Transition Metal Catalyst Component

To 1 g of Silica Support #7 slurried in 50 ml of ISOPAR TM E is added 1.2 mmol of butylethylmagnesium butoxide (BEMB from Texas Alkyls Inc). The resulting slurry is stirred for one hour after which 0.60 mmol of titanium tetrachloride (TiCl4) is added. The slurry rapidly darkens to a deep brown color and is stirred for a further two hours. An aliquot of a solution of ethylaluminum dichloride (3.5 mmol Al) is then added and the final mixture is stirred for 17 hours. The mixture is treated with 0.60 mmol of vanadium trichloride oxide (VOCl3) and then stirred for 4 hours.

The catalyst has the following ratios:
Mg/Al/Cl/V/Ti of 2/5.8/18/1/1
Si/Mg of 13.9/1

B. Activation and Polymerization Under Solution Conditions

After activating the catalyst with triethylaluminum (Al/Ti=5/1) the polymerization is conducted using the solution polymerization procedure.

The polymer product has a density of 0.9239 g/cm³ and an I2 value of 2.36 and is produced at an efficiency of 790 Kg PE/g Ti and 57 Kg PE/g Cl.

EXAMPLE 13

A. Preparation of Transition Metal Catalyst Component

To 1 gram of Silica Support #7 in ISOPAR TM E is added 1.2 mmol of butylethylmagnesium butoxide. After stirring the mixture for two hours, 3.5 mmol of ethylaluminum dichloride is added and the mixture is stirred for 17 hours. To this mixture is then added a 1:1 molar mixture of TiCl4 and VOCl3 (0.6 mmol Ti/0.6 mmol V). This mixture is stirred for 8 hours.

The catalyst has the following ratios:
Mg/Al/Cl/V/Ti of 2/5.8/18/1/1; and
Si/Mg of 13.9/1.

B. Activation of Catalyst and Polymerization Under Solution Conditions

After activating the catalyst with triethylaluminum (Al/Ti=5/1), the polymerization is conducted using the solution polymerization procedure.

The polymer product has an efficiency of 742 Kg PE/g Ti and 54 Kg PE/g Cl.

EXAMPLE 14

A Preparation of Transition Metal Catalyst Component

To 1 g of Silica Support Sample #7 slurried in ISOPAR TM E is added 2.0 mmol of butylethylmagnesium butoxide, 1.8 mmol titanium tetrachloride and 1.8 mmole of vanadium trichloride oxide and the mixture is stirred for 4 hours. The mixture is then treated with 6.5 mmol of ethylaluminum dichloride and the slurry stirred for 24 hours. The atomic ratios of Mg/Al/Cl/Ti/V for this catalyst are 1.1/3.6/13/1/1.

B. Activation of Catalyst and Polymerization

An aliquot of the catalyst is diluted and activated according to Example 1B using a triethylaluminum to titanium ratio of 8.5:1. The polymerization is carried out according to the procedure for solution process polymerizations at the temperatures shown in Table X.

TABLE X

| Run No. | Run Temp. °C. | Density g/cc | I2 | Efficiency (Kg PE per gram of Ti or Cl) Ti | Cl |
|---|---|---|---|---|---|
| A | 185 | 0.9251 | 0.81 | 945 | 98 |
| B | 215 | 0.9259 | 0.71 | 319 | 33 |

EXAMPLE 15

A. Preparation of Transition Metal Catalyst Component

To 1 g of Silica Support #7 slurried in Isopar TM E was added 2.0 mmol of magnesium bis(2,6-dimethylcyclohexoxide), 0.2 mmol titanium tetrachloride and the mixture was stirred for 1 hour. The mixture was then treated with 5.5 mmol of ethylaluminum dichloride and the slurry stirred for 24 hours. The atomic ratio of Mg/Al/Cl/Ti for this catalyst was 10/27.5/59/1.

B. Activation of Catalyst and Polymerization

An aliquot of the catalyst was diluted and activated according to Example 1B using a triethylaluminum to titanium ratio of 12:1. The polymerization was carried out according to the procedure for solution process polymerizations at 185° C. The polymer product had a density of 0.9332 g/cm$^3$ and an $I_2$ value of 2.42 g/10 min, an $I_{10}/I_2$ ratio of 8.0 and was produced at an efficiency of 149 Kg PE/g Ti and 3.4 Kg PE/g Cl.

EXAMPLES 16-32

Preparation of Catalyst for Example 16

A 410 g sample of Davison SYLOID TM 245 silica is heated at 800° C. in a rotary kiln under nitrogen and then slurried in 3 gallons (11.35L) of ISOPAR TM E. This silica support has a surface area of 401 m$^2$/gram, and a particle size of 3 microns. A 12 gallon (45.4L) vessel is charged with 20 lbs (9.07 kg) of Isopar E followed by the silica slurry.

After silica addition, 1.86 kg of butylethylmagnesium butoxide (BEMB, Texas Alkyls, 0.97 wt % Mg in heptane) is then added. The slurry is stirred for 2 hours followed by the addition of 157 mL of an equimolar mixture of titanium tetrachloride and vanadium oxytrichloride (VTi mix, Akzo Chemical) is added. After the addition, the slurry is stirred for one hour and then 4.8 kg of ethylaluminum dichloride (EADC, Texas Alkyls, 2.15 wt % Al in hexane) is then added.

The catalysts employed in Examples 17 to 32 are prepared in a manner similar to that described above for Example 16.

COMPARATIVE EXAMPLE A*

A 445 g sample of Davison SYLOID TM 245 silica is heated at 800° C. in a rotary kiln under nitrogen and then slurried in 3 gallons (11.35L) of ISOPAR TM E. This silica support has a surface area of 391 m$^2$/gram, and a particle size of 3 microns. A 12 gallon (45.4L) vessel is charged with 20 lbs (9.07 kg) of Isopar E followed by the silica slurry.

After silica addition, 2.01 kg of butylethylmagnesium butoxide (BEMB, Texas Alkyls, 0.97 wt % Mg in heptane) is then added. The slurry is stirred for 2 hours followed by the addition of 19.5 mL of neat titanium tetrachloride (TiCl$_4$, Aldrich Chemicals) is added. After the Ti addition, the slurry is stirred for one hour and then 2.38 kg of ethylaluminum dichloride (EADC, Texas Alkyls, 2.15 wt % Al in hexane) is then added.

The dilute catalyst is then injected into the reactor of a continuous solution process pilot plant. Reactor temperature is controlled by the catalyst injection rate. The triethylaluminum (TEA) sidestream co-catalyst is injected into the reactor entry line. Reactor temperature and TEA/Ti ratios are varied to optimize catalyst efficiency. A standard additive package of 1250 ppm calcium stearate, 200 ppm IRGANOX TM 1010, and 1200 ppm IRGAFOS TM 168 in the polymer is injected as a slurry after the reactor.

Film Manufacture

Film is made using the copolymers of the present invention by fabricating on a three layer (A/B/C) co-extrusion cast film line. For examples 16-21 and Comparative Example A*, the same copolymer is simultaneously extruded through all three extruders, making a three layer film structure having the same copolymer in each layer. The line speed is maintained at approximately 800 feet/minute at a total gauge of about 0.8 mils using a 30 inch manual adjust die. The draw distance from the die to the primary chill roll for these experiments is about 5 inches. For Examples 16-21 and Comparative Examples A* and B*, the three extruders are operated as follows:

TABLE XI

| Extruder | diameter (inches) | RPM | Throughput (lbs/hour) | percent of total structure | Melt Temp (°F.) |
|---|---|---|---|---|---|
| A | 2.5 | 27.4 | 52.5 | 15 | 549 |
| B | 3.5 | 48.4 | 245 | 70 | 552 |
| C | 2 | 44.8 | 52.5 | 15 | 544 |

Film performance is evaluated using a Lantach SHS rotary wrapping machine. The film is placed on the pallet wrapper and stretched wrapped beginning at 0 percent elongation. The film elongation is gradually increased until the film cannot be stretched any farther without breaking. The final elongation beyond which the film cannot be stretched wrapped is called the ultimate stretch point or ultimate stretchability for that film. Films which have the highest ultimate stretchability have the most preferred performance.

The puncture resistance of the film is measured by cutting each sample to a size of 6 inches (15.2 cm) by 6 inches from the film and testing the film samples on an Instron Tensile Tester. The Instron is equipped with a 100 pound load cell and is operated at a cross-head speed and chart speed of 10 inches/minute. The load range is up to 50 percent. Each sample is held in place by a clamping unit which has a 4 inch (10.2 cm) diameter circular interior. The thickness (T) of the center of each film sample is measured and recorded. Each sample is secured into the clamping unit. A 0.5 inch diameter (1.3 cm) ball attached to the end of a rod is used as the puncturing mechanism. The puncture probe (attached to the upper cross-head) is lowered onto and into the film until the film punctures, or the cross-head has traveled 8 inches, or 40 pounds force is reached. At puncture, the energy (E) required to break the film is recorded. The puncture resistance (PR) is then calculated by the following equation:

$PR = E/(12)*(T)*(A)$, where:
PR is puncture resistance in foot-pounds/in$^3$,
E is the puncture energy in inch-pounds,
12 inches/foot is a conversion factor,
T is the film thickness in inches, and
A is the area of the clamped film specimen sample (12.56 in$^2$ for these samples).
Six samples are tested for each film and the results are averaged.

EXAMPLES 16-21

Examples 16-21 in Table XIA summarizes the catalyst formulation for each example. The data in Table XIB summarizes the copolymer product data observed using the catalysts and process of the current invention at a constant reactor temperature of 195° C. while targeting a 2.3 melt index, 0.917 g/cm³ density product using octene as comonomer, as well as properties of cast film made from the copolymers. The comonomer and hydrogen are adjusted to achieve the target density and melt index, respectively. Broad SCBD copolymers contain more comonomer than narrow SCBD copolymers.

Copolymers shown in Table XIB, produced from the catalysts described in Table XIA, clearly demonstrate an increase in z-ratio and decrease in crystallization onset temperature, as the Mg:Ti ratio of the catalyst increases.

Table XIB also demonstrates that films made from the copolymers made using the novel catalysts and process of the present invention have excellent ultimate stretchability and good puncture resistance, especially when the copolymers have a percent high density

TABLE XIA

| Ex. or C.E. No. | Catalyst Properties** | | | | |
|---|---|---|---|---|---|
| | Surface Area m²/gram | Catalyst Composition millimoles/gram of SiO₂ | | | |
| | | Mg | Ti | V | Al |
| 16 | 400 | 2.0 | 1.8 | 1.8 | 9 |
| 17 | 270 | 2.0 | 1.8 | 1.8 | 9 |
| 18 | 360 | 2.0 | 1.0 | 1.0 | 6 |
| 19 | 400 | 2.0 | 0.6 | 0.6 | 6 |
| 20 | 270 | 2.0 | 0.6 | 0.6 | 6 |
| 21 | 260 | 2.0 | 0.4 | 0.4 | 5 |
| A* | 390 | 2.0 | 0.4 | 0.0 | 5 |
| B* | NA | NA | NA | NA | NA |

*Not an example of the catalysts chained in the present invention.
NA = Not Available
**Average particle size of the supports used in 3 microns

TABLE XIB

| Ex. or C.E. No. | Polymer Properties | | | | | | | |
|---|---|---|---|---|---|---|---|---|
| | I₂ grams per 10 min. | I₁₀/I₂ Ratio | Density g/cm³ | $M_w/M_n$ | % High Density | Cryst. onset temp. °C. | $z_1/z_0$ Ratio | Film Ultimate Stretch (percent) | Puncture (ft-lbs/in³) |
| 16 | 2.31 | 7.2 | 0.9177 | 3.2 | 24.4 | 111.2 | 0.823 | 330 | 303 |
| 17 | 2.33 | 7.2 | 0.9170 | 3.1 | 22.7*** | 111.5 | 0.908 | 340 | 264 |
| 18 | 2.38 | 7.1 | 0.9173 | 2.9 | 17.4 | 110.0 | 0.933 | 320 | 304 |
| 19* | 2.24 | 7.3 | 0.9173 | 3.0 | 13.3 | 109.6 | 1.059 | 295 | 353 |
| 20* | 2.37 | 7.3 | 0.9172 | 3.1 | 12.2 | 108.6 | 1.05 | 310 | 322 |
| 21* | 2.39 | 7.5 | 0.9166 | 3.2 | 9.6 | 108.6 | 1.30 | 280** | 330 |
| A* | 2.40 | 8.2 | 0.9174 | 3.5 | 11.6 | — | 1.18 | 275 | 291 |
| B* | 1.97 | 7.9 | 0.9208 | 3.9 | 34.0 | — | — | 320 | 225 |

*Not an example of films claimed in the present invention.
**Average of 2 trials (265% and 290%, rounded to nearest 5%)
***Average of 2 trials (22.3% and 23.1%)

greater than about 17 percent and a $M_w/M_n$ ratio of less than about 3.6, especially less than about 3.3."

Comparative Experiment A*, when compared to Examples 16-21, illustrates the importance of the presence of vanadium in the catalyst on z ratio, I₁₀/I₂ and percent stretch. Comparative Example B* is an ethylene/1-hexene gas phase copolymer sold into the stretch film market for use in pallet wrapping and is produced by Exxon Chemical (known as Exxon 3002.37). Comparing the film made from Examples 16-18 with films made from Examples 19-21 and from comparative examples A* and B* shows that a copolymer having the combination of narrow molecular weight distribution (i.e., a low $M_w/M_n$) and broad SCBD (high percent high density fraction), when made into cast film, has both high ultimate stretchability and good puncture resistance.

The following Examples 22 to 27 in Table XII summarize the catalyst formulation and product data which is observed using the process of the current invention at varying reactor temperature and targeting a 1.0 melt index, 0.920 g/cm³ density blown film product using octene as comonomer.

TABLE XII

| Ex. No. | Surface Area (m2/gm) | Catalyst Composition millimoles/gram of SiO₂ | | | | Polym. Temp. °C. | I₂ grams per 10 min. | I₁₀/I₂ Ratio | Density g/cm³ | $z_1/z_0$ Ratio |
|---|---|---|---|---|---|---|---|---|---|---|
| | | Mg | Ti | V | Al | | | | | |
| 22 | 374 | 2.0 | 1.8 | 1.8 | 6.5 | 180 | 0.96 | 7.2 | 0.9201 | 0.834 |
| 23 | 374 | 2.0 | 1.8 | 1.8 | 6.5 | 210 | 1.04 | 7.1 | 0.9195 | 0.864 |
| 24 | 374 | 2.0 | 1.8 | 1.8 | 6.5 | 225 | 0.97 | 8.0 | 0.9206 | 0.821 |
| 25 | 420 | 2.0 | 0.6 | 0.6 | 6.5 | 180 | 0.97 | 7.0 | 0.9201 | 1.111 |
| 26 | 420 | 2.0 | 0.6 | 0.6 | 6.5 | 210 | 1.07 | 7.7 | 0.9189 | 1.190 |
| 27 | 428 | 2.0 | 1.2 | 1.2 | 4.7 | 195 | 1.07 | 7.4 | 0.9189 | 0.980 |

EXAMPLES 28-32

These examples summarize the catalyst formulation and product data observed using the process of the current invention at 175° C. reactor temperature and targeting a 0.8 melt index, 0.905 g/cm³ density blown film product using octene as comonomer. The catalyst composition and results are given in Table XIII. The copolymers produced from the catalysts described in Table XIII clearly show an increase in z-ratio as the Mg:Ti ratio of the catalysts increases.

TABLE XIII

| Ex. No. | Catalyst Composition millimoles/gram of SiO₂ | | | | Polym. Temp. °C. | I₂ grams per 10 min. | I₁₀/I₂ Ratio | Density g/cm³ | $z_1/z_0$ Ratio |
|---|---|---|---|---|---|---|---|---|---|
| | Mg | Ti | V | Al | | | | | |
| 28 | 2.0 | 0.6 | 0.6 | 6.1 | 175 | 0.80 | 7.8 | 0.9041 | 1.123 |
| 29 | 2.0 | 0.2 | .2 | 5.2 | 175 | 0.88 | 8.6 | 0.9049 | 1.257 |
| 30 | 2.0 | 0.2 | 0.2 | 4.5 | 175 | 0.78 | 8.9 | 0.9055 | 1.168 |
| 31 | 2.0 | 0.6 | 0.6 | 5.4 | 175 | 0.80 | 8.1 | 0.9058 | 1.109 |

TABLE XIII-continued

| Ex. No. | Catalyst Composition millimoles/gram of SiO$_2$ | | | | Polym. Temp. °C. | I$_2$ grams per 10 min. | I$_{10}$/I$_2$ Ratio | Density g/cm$^3$ | z$_1$/z$_0$ Ratio |
|---|---|---|---|---|---|---|---|---|---|
| | Mg | Ti | V | Al | | | | | |
| 32 | 2.0 | 0.4 | 0.4 | 4.7 | 175 | 0.80 | 8.2 | 0.9059 | 1.121 |

EXAMPLE 33

Compression molded plaques of the polymers of Examples 16 and 27 are subjected to morphological analysis at a magnification of 200× as described previously. The optical micrograph of these thin plaque indicate the spherulite size shown in Table XIII.

COMPARATIVE EXAMPLE C*

For comparative purposes, a polymer is prepared using the catalyst disclosed in Example 7 of U.S. Pat. No. 4,547,475, the disclosure of which is incorporated herein by reference.

A compression molded plaque of about 1–4 mils thickness of the polymers prepared from this catalyst is subjected to morphological analysis at a magnification of 200×. The optical micrograph of this plaque indicates the spherulite size shown in Table XIV.

TABLE XIV

| Catalyst from | Spherulite size** (microns) |
|---|---|
| Ex. 16 | 10 |
| Ex. 27 | 10 |
| Comp. Ex. C* | 48 |

**Determined by SALLS (small angle laser light scattering)

The smaller spherulite size produced by the polymers prepared by the process of the present invention is advantageous because small spherulites typically result in improved clarity and toughness over polymers of identical structure, but having larger spherulite size.

What is claimed is:

1. A process for polymerizing one or more α-olefins and optionally one or more polymerizable ethylenically unsaturated compounds other than an α-olefin which process comprises contacting the materials to be polymerized with (A) a supported transition metal containing catalyst component comprising the product resulting from contacting (1) a solid, porous inorganic oxide support material selected from the group consisting of silica, alumina, or a combination of silica and alumina, said support material containing not greater than about 5 millimoles of hydroxyl groups per gram of support material and a particle size not greater than 10 microns and a surface area of from about 50 to about 800 m$^2$/g; (2) a hydrocarbon soluble organomagnesium alkoxide or hydrocarbon soluble magnesium dialkoxide represented by the formula R$_x$Mg(OR)$_y$ wherein each R is independently a hydrocarbyl group having from 1 to about 20 carbon atoms; x+y=2; and 0.5≦y≦2; (3) a titanium compound optionally; (4) a vanadium compound; and (5) a Group IIIA metal alkyl halide; and wherein the components are employed in amounts which provide the following atomic ratios:

Si+Al (from the inorganic oxide support):Mg of from about 1:1 to about 50:1;
Mg:Ti of from about 0.1:1 to about 40:1;
Mg:V, when present, of from about 0.1:1 to about 40:1;
Mg:IIIA metal of from about 0.01:1 to about 100:1;

V:Ti of from about 0:1 to about 10:1; and (B) a cocatalyst or activator for component (A).

2. A process of claim 1 wherein
(a) said solid support material contains not greater than about 4 millimoles of hydroxyl groups per gram of support material, a particle size of from about 1 to about 8 microns and a surface area of from about 150 to about 600 m$^2$/g;
(b) said transition metal catalyst contains an atomic ratio of Si+Al (from the inorganic oxide support):Mg of from about 2:1 to about 40:1;
(c) said transition metal catalyst contains an atomic ratio of Mg:Ti of from about 0.2:1 to about 20:1;
(d) said transition metal catalyst contains an atomic ratio of Mg:V, when present, of from about 0.2:1 to about 20:1;
(e) said transition metal catalyst contains an atomic ratio of Mg:IIIA metal of from about 0.05:1 to about 10:1; and
(f) said transition metal catalyst contains an atomic ratio of V:Ti of from about 0:1 to about 5 1.

3. A process of claim 1 wherein
(a) said solid support material contains not greater than about 3 millimoles of hydroxyl groups per gram of support material, a particle size of from about 2 to about 5 microns and a surface area of from about 300 to about 500 m$^2$/g;
(b) said transition metal catalyst contains an atomic ratio of Si+Al (from the inorganic oxide support):Mg of from about 4:1 to about 20:1;
(c) said transition metal catalyst contains an atomic ratio of Mg:Ti of from about 0.5:1 to about 10:1;
(d) said transition metal catalyst contains an atomic ratio of Mg:V, when present, of from about 0.5:1 to about 10:1;
(e) said transition metal catalyst contains an atomic ratio of Mg:IIIA metal of from about 0.1:1 to about 5:1; and
(f) said transition metal catalyst contains an atomic ratio of V:Ti of from about 0:1 to about 1:1.

4. A process of claim 1, 2 or 3 wherein
(a) said solid support material is silica;
(b) said titanium compound is a compound represented by the formula TiX$_{4-a}$(OR')$_a$ wherein each R' is independently an alkyl group having from 1 to about 20 carbon atoms, X is a halogen atom, and a has a value from zero to 4;
(c) said vanadium compound, when present, is a compound represented by the formula VX$_{4-a}$(OR)$_a$ wherein each R' is independently an alkyl group having from 1 to about 20 carbon atoms, X is a halogen atom, and a has a value from zero to 4;
(d) said Group IIIA metal alkyl halide is a compound represented by the formula R'$_y$MX$_z$ wherein M is a metal from Group IIIA of the Periodic Table of the Elements, each R' is independently an alkyl group having from 1 to about 20 carbon atoms; X is a halogen atom, y and z each independently have a value from 1 to a value equal to the valence of M minus 1 and y+z has a value equal to the valence of M; and (e) said α-olefin contains from 2 to about 8 carbon atoms or any combination of any two or more of such α-olefins.

5. A process of claim 1, 2 or 3 wherein
(a) component (2) is ethylmagnesium ethoxide, butylmagnesium ethoxide, octylmagnesium ethoxide, butylmagnesium butoxide, ethylmagnesium butoxide, butylmagnesium octoxide, s-butylmagnesium octoxide or any combination of such compounds;
(b) said titanium compound is titanium tetrachloride, titanium tetraisopropoxide, or any combination of such compounds;
(c) said vanadium compound, when present is vanadium tetrachloride, vanadium oxytrichloride, or any combination of such compounds; and
(d) said Group IIIA metal alkyl halide is ethylaluminum dichloride, i-butylaluminum dichloride, ethylaluminum sesquichloride or any combination of such compounds; and
(e) said α-olefin is ethylene, propylene, butene-1, hexene-1, octene-1, 4-methylpentene-1 or any combination of any two or more of such compounds.

6. A process for varying the short chain branching distribution (SCBD) of ethylene/α-olefin copolymers which comprises (I) subjecting ethylene and one or more α-olefin comonomers to solution polymerization conditions in the presence of a catalyst composition comprising (A) a supported transition metal containing catalyst component comprising the product resulting from contacting (1) a porous solid inorganic oxide support material selected from the group consisting of silica, alumina, or a combination of silica and alumina, said support material containing not greater than about 5 millimoles of hydroxyl groups per gram of support material and a particle size less than 10 microns and a surface area of from about 50 to about 800 m$^2$/g; (2) an organomagnesium compound hydrocarbon soluble organomagnesium alkoxide or hydrocarbon soluble magnesium dialkoxide; (3) a titanium compound; optionally (4) a vanadium compound; and (5) a Group IIIA metal alkyl halide; and wherein the components are employed in amounts which provide the following atomic ratios:
Si+Al:Mg of from about 1:1 to about 30:1;
Mg:Ti of from about 0.2:1 to about 10:1;
Mg:V of from about 0.2:1 to about 10:1;
Mg:IIIA metal of from about 0.05:1 to about 5:1;
V:Ti of from about 0.8:1 to about 1.2:1; and (B) a cocatalyst or activator for component (A); and (II) controlling the SCBD by varying the ratio of Mg:Ti in component (A).

7. A process of claim 6 wherein
(a) said solid support material contains not greater than about 4 millimoles of hydroxyl groups per gram of support material, a particle size of from about 1 to about 8 microns and a surface area of from about 150 to about 600 m$^2$/g;
(b) said transition metal catalyst contains an atomic ratio of Si+Al (from the inorganic oxide support):Mg of from about 2:1 to about 40:1;
(c) said transition metal catalyst contains an atomic ratio of Mg:Ti of from about 0.2:1 to about 20:1;
(d) said transition metal catalyst contains an atomic ratio of Mg:V, when present, of from about 0.2:1 to about 20:1;
(e) said transition metal catalyst contains an atomic ratio of Mg:IIIA metal of from about 0.05:1 to about 10:1; and
(f) said transition metal catalyst contains an atomic ratio of V:Ti of about 1:1.

8. A process of claim 6 wherein
(a) said solid support material contains not greater than about 3 millimoles of hydroxyl groups per gram of support material, a particle size of from about 2 to about 5 microns and a surface area of from about 300 to about 500 m$^2$/g;
(b) said transition metal catalyst contains an atomic ratio of Si+Al (from the inorganic oxide support):Mg of from about 4:1 to about 20:1;
(c) said transition metal catalyst contains an atomic ratio of Mg:Ti of from about 0.5:1 to about 10:1;
(d) said transition metal catalyst contains an atomic ratio of Mg:V, when present, of from about 0.5:1 to about 10:1;
(e) said transition metal catalyst contains an atomic ratio of Mg:IIIA metal of from about 0.1:1 to about 5:1; and
(f) said transition metal catalyst contains an atomic ratio of V:Ti of about 1:1.

9. A process of claim 6, 7 or 8 wherein
(a) said solid support material is silica;
(b) said magnesium compound is a compound represented by the formulas $R_xMg(OR)_y$, wherein each R is independently a hydrocarbyl group having from 1 to about 20 carbon atoms, $x+y=2$, and $0.5 \leq y \leq 2$;
(c) said titanium compound is a compound represented by the formula $TiX_{4-a}(OR')_a$ wherein each R' is independently an alkyl group having from 1 to about 20 carbon atoms, X is a halogen atom, and a has a value from zero to 4;
(d) said vanadium compound, when present, is a compound represented by the formula $VX_{4-a}(OR)_a$ wherein each R' is independently an alkyl group having from 1 to about 20 carbon atoms, X is a halogen atom, and a has a value from zero to 4;
(e) said Group IIIA metal alkyl halide is a compound represented by the formula $R'_yMX_z$ wherein M is a metal from Group IIIA of the Periodic Table of the Elements, each R' is independently an alkyl group having from 1 to about 20 carbon atoms; X is a halogen atom, y and z each independently have a value from 1 to a value equal to the valence of M minus 1 and y+z has a value equal to the valence of M; and
(f) said α-olefin contains from 2 to about 8 carbon atoms or any combination of any two or more of such α-olefins.

10. A process of claim 6, 7 or 8 wherein
(a) component (2) said magnesium compound is ethylmagnesium ethoxide, butylmagnesium ethoxide, octylmagnesium ethoxide, butylmagnesium butoxide, ethylmagnesium butoxide, butylmagnesium octoxide, s-butylmagnesium octoxide or any combination of such compounds;
(b) said titanium compound is titanium tetrachloride, titanium tetraisopropoxide, or any combination of such compounds;
(c) said vanadium compound, when present is vanadium tetrachloride, vanadium oxytrichloride, or any combination of such compounds; and
(d) said Group IIIA metal alkyl halide is ethylaluminum dichloride, i-butylaluminum dichloride, ethylaluminum sesquichloride or any combination of such compounds; and
(e) said α-olefin is ethylene, propylene, butene-1, hexene-1, octene-1, 4-methylpentene-1 or any combination of any two or more of such compounds.

* * * * *

UNITED STATES PATENT AND TRADEMARK OFFICE
CERTIFICATE OF CORRECTION

PATENT NO. : 5,231,151
DATED : July 27, 1993
INVENTOR(S) : Lee Spencer et al.

It is certified that error appears in the above-identified patent and that said Letters Patent is hereby corrected as shown below:

On the title page, item (75), delete last three inventors:
"Jeffrey J. Wooster, Lake Jackson; Pak-Wing S. Chum, Lake Jackson; Jacquelyn A. deGrant, Freeport, Tex.

Column 34, line 28, "5 1." should read --5:1.--

Column 35, line 65, "0.05 1" should read --0.05:1--

Column 36, line 13, "0.5 1" should read --0.5:1--

Signed and Sealed this

Seventh Day of June, 1994

Attest:

BRUCE LEHMAN

Attesting Officer

Commissioner of Patents and Trademarks